(12) United States Patent
Reichinger

(10) Patent No.: US 12,229,107 B2
(45) Date of Patent: Feb. 18, 2025

(54) COMPACT PROBABILISTIC DATA STRUCTURE FOR STORING STREAMED LOG LINES

(71) Applicant: Dynatrace LLC, Waltham, MA (US)

(72) Inventor: Julian Reichinger, Sankt Johann Am Wimberg (AT)

(73) Assignee: Dynatrace LLC, Waltham, MA (US)

( * ) Notice: Subject to any disclaimer, the term of this patent is extended or adjusted under 35 U.S.C. 154(b) by 0 days.

(21) Appl. No.: 18/119,331

(22) Filed: Mar. 9, 2023

(65) Prior Publication Data

US 2024/0256513 A1 Aug. 1, 2024

Related U.S. Application Data

(60) Provisional application No. 63/437,865, filed on Jan. 9, 2023.

(51) Int. Cl.
*G06F 16/22* (2019.01)
*G06F 16/2457* (2019.01)

(52) U.S. Cl.
CPC .... *G06F 16/2282* (2019.01); *G06F 16/24573* (2019.01)

(58) Field of Classification Search
CPC .................................................. G06F 16/2282
USPC .......................................................... 707/769
See application file for complete search history.

(56) References Cited

U.S. PATENT DOCUMENTS

| | | | |
|---|---|---|---|
| 10,853,359 | B1 | 12/2020 | Waugh et al. |
| 2008/0275847 | A1* | 11/2008 | Chellapilla ......... G06F 16/9014 |
| 2010/0205364 | A1* | 8/2010 | Gazit ................. G06F 16/90339 |
| | | | 711/108 |
| 2013/0085999 | A1* | 4/2013 | Tung ..................... G06F 11/1464 |
| | | | 707/654 |
| 2016/0004769 | A1 | 1/2016 | Gukal |
| 2017/0357710 | A1 | 12/2017 | Shtossel et al. |
| 2017/0364700 | A1* | 12/2017 | Goldfarb ............... H04L 9/3247 |
| 2018/0152708 | A1* | 5/2018 | George .................. H04N 19/70 |
| 2021/0075614 | A1* | 3/2021 | Wang .................. H04L 63/0421 |
| 2021/0194900 | A1* | 6/2021 | Schmidtler ......... H04L 63/1408 |
| 2023/0421365 | A1* | 12/2023 | Wright .................. H04L 9/0643 |

* cited by examiner

*Primary Examiner* — Muluemebet Gurmu
(74) *Attorney, Agent, or Firm* — Harness, Dickey & Pierce, P.L.C.

(57) ABSTRACT

A computer-implemented method is presented for storing log data generated in a distributed computing environment. The method includes: receiving a data element from a log line, where the data element is associated with a given computing source at which the log line was produced; applying a hash function to the data element to generate a hash value; updating a listing of computing entities with the given computing source, where entries in the listing of computing entities can identify more than one computing source and each entry in the listing of computing entities specifies a unique set of computing sources; and storing the hash value, along with an address, in a probabilistic data structure, where the address maps the hash value to an entry in the listing of computing entities.

21 Claims, 11 Drawing Sheets

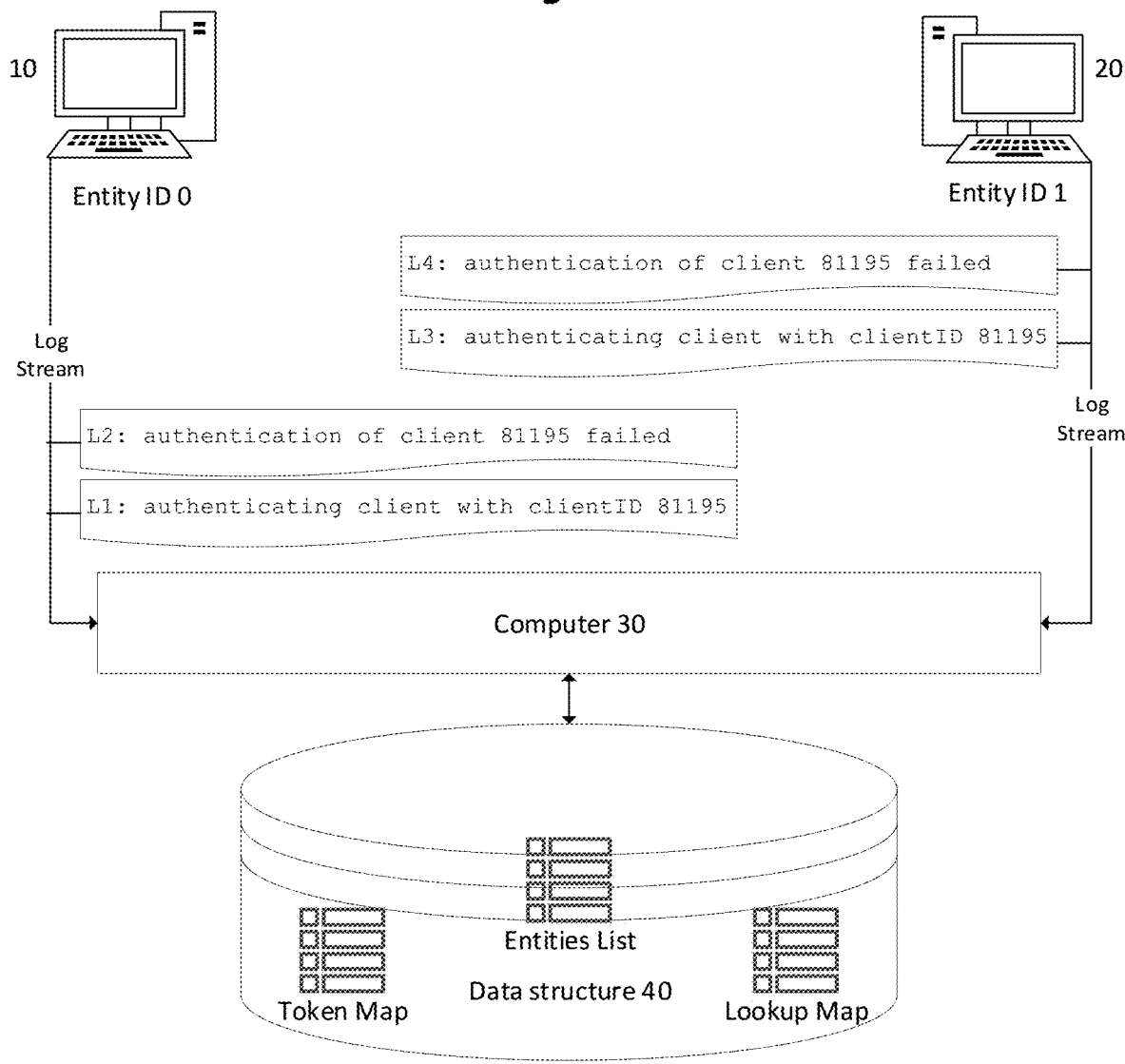

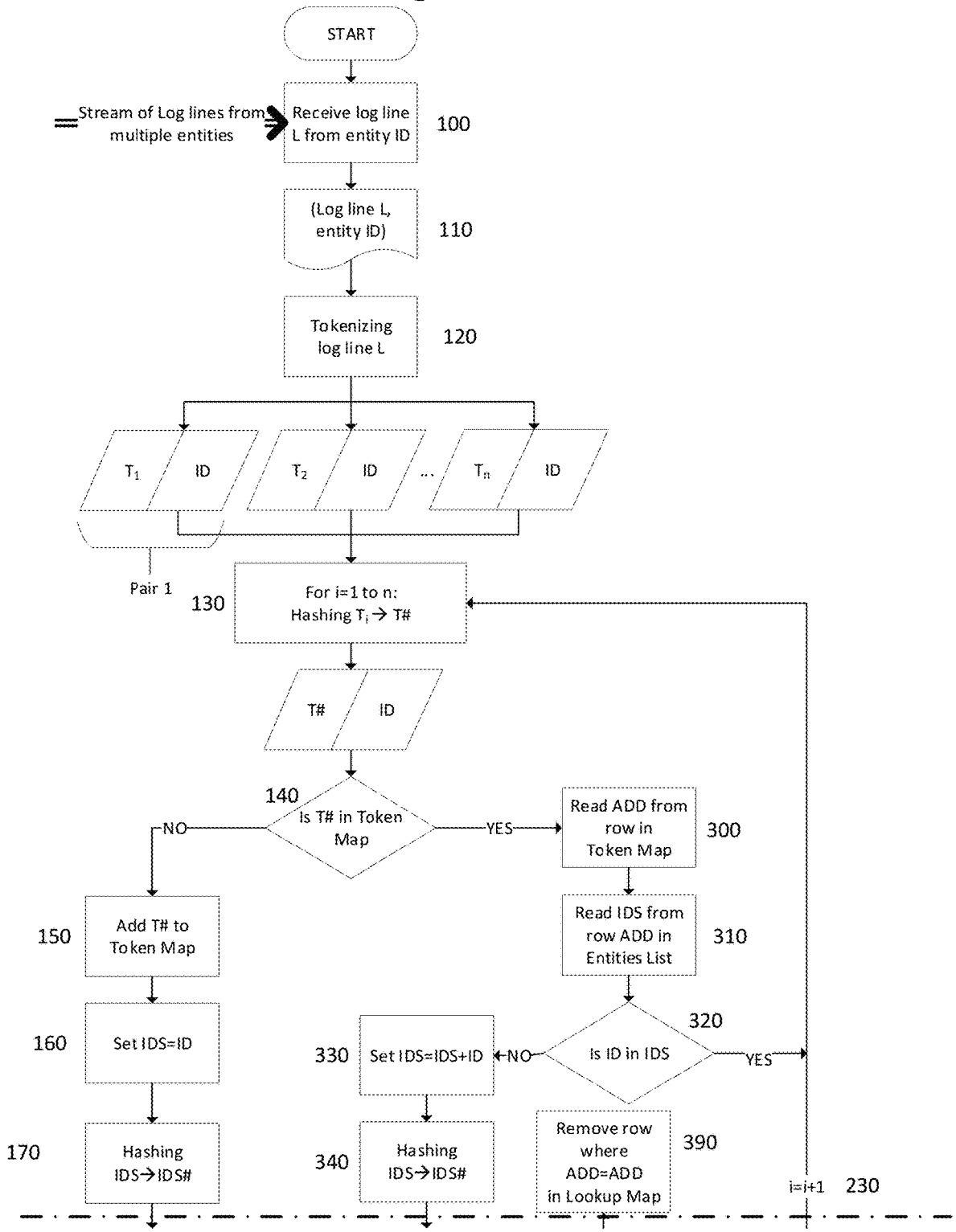

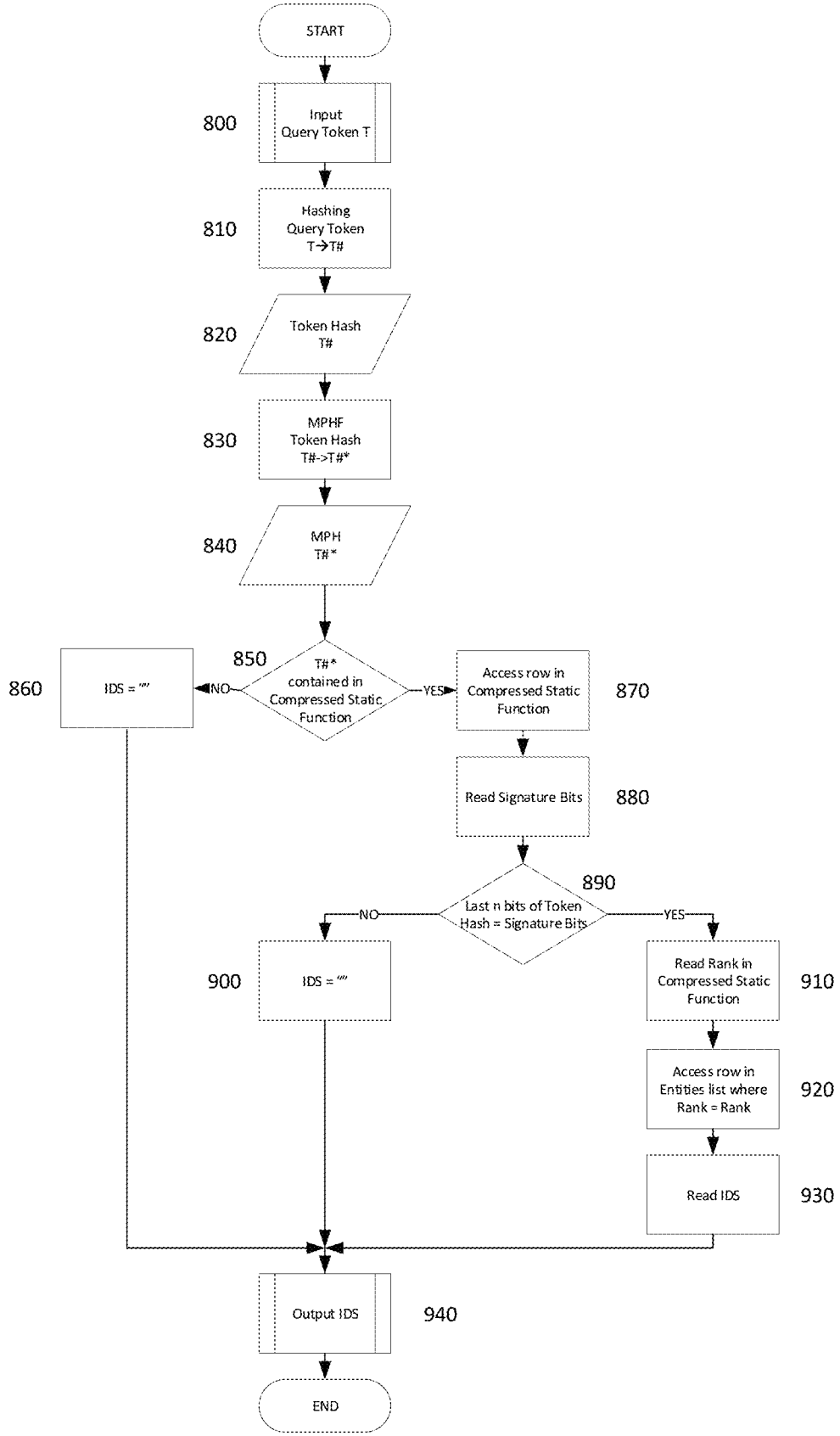

COMPACT PROBABILISTIC DATA STRUCTURE FOR STORING STREAMED LOG LINES

CROSS-REFERENCE TO RELATED APPLICATIONS

Figure 3B:
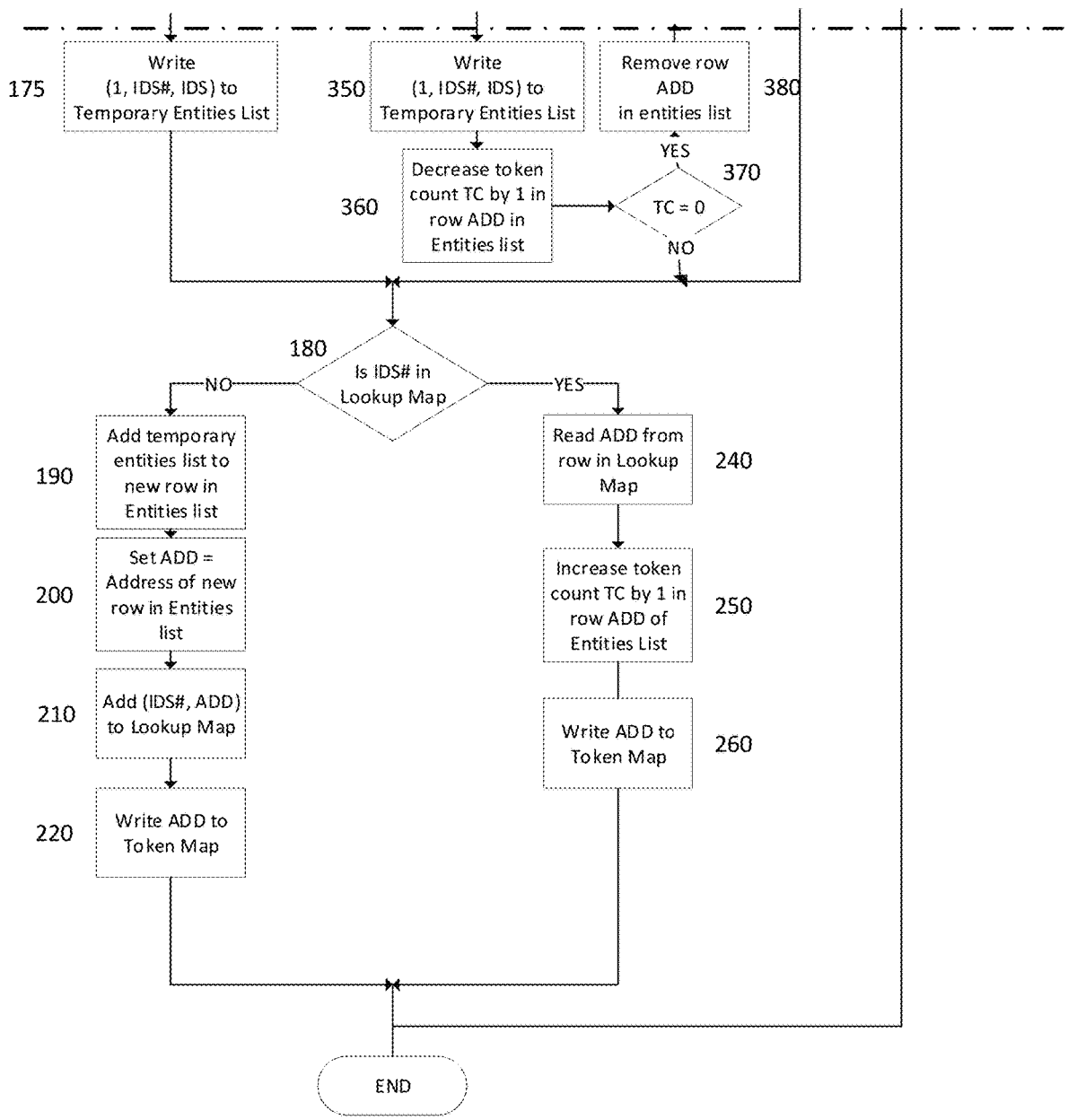

This application claims the benefit of U.S. Provisional Application No. 63/437,865, filed on Jan. 9, 2023. The entire disclosure of the above application is incorporated herein by reference.

FIELD

The disclosure concerns a computer implemented method for storing streamed log lines in a probabilistic data structure. A second aspect of the disclosure concerns a computer implemented method for querying the uncompressed probabilistic data structure for storing log lines. A third aspect of the disclosure concerns a computer implemented method for compressing the probabilistic data structure for storing log lines. A fourth aspect of the disclosure concerns a computer implemented method for querying the compressed probabilistic data structure for storing log lines. Finally, a fifth aspect of the disclosure concerns a file format for storing the compressed probabilistic data structure on a disk or for loading it into the RAM of a computer.

BACKGROUND

Operating systems for clients and servers, applications (both locally installed, web based and hybrid), networks including the cloud, and containers (such as Docker or Kubernetes) etc. generate log messages during their operation. Subsequently, the terms log message, log line or simply log are used synonymously for each other as all these terms are used frequently in the art. Each log line is associated to an identity ID, i.e. the ID (typically a number) of an entity, e.g. a specific application or container running on a computer, producing the log line. Logs can be stored and analyzed for many different purposes. In the field of application/computer monitoring, log lines are used to detect anomalies occurring during the operation of the computer system. Since an anomaly is often not detected in real time, log lines are typically stored in a database (short DB). The DB containing the log lines as data can be queried/searched later for one or more keywords in order to identify the root cause of the anomaly. The DB can be a local DB, e.g. a DB stored on a server in the local network, a hybrid DB, e.g. where a DB index is stored locally and the log lines are stored in the cloud, or a cloud DB, where both the index and the data are stored in a cloud network. In response to a database query, the ID of an entity is returned to the query consumer which indicates, that the keyword being queried is present in logs from the entity having the ID. In many cases, the keyword, e.g. an IP address, is contained in logs from multiple entities, such as applications, containers, the operating system, network components, servers, database instances etc. In a subsequent analysis step, the root cause of the problem can be identified by examining the occurrence of log lines over time.

Many database management systems (short DBMS) exist which allow the storage and the indexing of log lines in a database. Working without an index is currently not an option since it takes 71000 CPU cores approx. 10 s to search and find an IP address in 700 TB of log data. This is both in terms of the required CPU power and time unacceptable. On the other hand, DBMS exist that can handle big data and can perform queries within a reasonable period of time. One such solution is the Elastic/Lucene DBMS, which is widely used in the industry. However, even established solutions have limitations, as indexing is a tradeoff between query performance and storage costs. In some cases, a full index done by an Elastic/Lucene DBMS may be larger than the actual data from which the index is constructed in compressed form. This is an issue particularly when massive amounts of data/log lines are stored over longer periods of time. It is noted that although computer systems become ever more powerful, the rate of data ingest exceeds the performance gain of computers by far. Consequently, there is a need to make storing streamed log lines in a data structure more efficient, the data structure more compact, and querying the data structure a lot faster than in prior art systems.

This section provides background information related to the present disclosure which is not necessarily prior art.

SUMMARY

This section provides a general summary of the disclosure, and is not a comprehensive disclosure of its full scope or all of its features.

During the process of storing log lines in the probabilistic data structure (also referred to as the construction of the probabilistic data structure) three tables are used, namely a Token Map table, an Entities List table, and a Lookup Map table. The token map table comprises two columns, namely a TokenHash column containing hash values of the stored tokens, and an ADD column. Each field in the ADD column contains just one pointer from the token map table to a row in the entities list table. A hash value typically is 4 bytes long; in 64-bit operating systems, a pointer typically is 8 bytes long. The entities list table comprises four columns, namely an ADD column as described above, a TC column containing the "token counts", i.e. the number of token hashes pointing to a row in the entities list table, an IDS # column containing the hash values of the list of identities IDS, and the lists of identities IDS themselves. Note that the ADD fields in the ADD column of the entities list table are not data fields per se since every row in a table inherently has an address associated to it. The TC column contains integer values. The IDS # column contains hash values, and the fields in the IDS column contain a list of integers representing the identities IDS of entities, respectively. Finally, the lookup map table comprises two columns, namely another IDS # column and another ADD column, both as described above.

The entities list table containing the list of identities IDS can be accessed by two external keys, namely i. via the token hashes in the token map, and ii. via the hashes IDS # of the list of identities IDS in the lookup map. Both hash keys are used during the construction of the probabilistic data structure.

As the token map table contains hash values of the atomized tokens, the data structure is by definition a so-called "probabilistic data structure", i.e. that some level of false-positives need to be accepted due to the design of the data structure. Probabilistic data structures rely on hashes for storing and/or querying data to/from the data structure. Due to the transformation (also known as hashing) from tokens into hashes, it cannot be ruled out that two distinct tokens are mapped to the same hash value. In prior art solutions, indexes are used to quickly retrieve tokens from a database. The process of adding tokens to an index is called indexing.

However, as traditional indexes do not employ hashing of the tokens, they are not considered to be probabilistic data structures.

A token is typically an element of the log line, e.g. a word separated by blanks from another word in the same log line. As different tokenization strategies are known in the art, the tokenization by white-space characters is just an example of one strategy. The token hash in this disclosure is a 4-byte value representing the token and has the function of a signature identifying the token in compact form. Nevertheless, it cannot be ruled out that due to the design of the hashing algorithm and particularly the length of the hash value, two differing tokens are mapped to the same hash value. This unlikely case is possible due to the design of the probabilistic data structure and must be considered during storing and retrieving data from the probabilistic data structure. Using hash values as keys for the token map table is, however, not a design fault but rather a feature of the data structure, allowing that the probabilistic data structure is much more compact than a traditional index, and in addition that the probabilistic data structure can be searched/queried at much higher speeds etc. The false-positive rate of the probabilistic data structure is typically <0.0001%, which is lower than 1 false hit in some 10 million cases.

According to the teaching of the disclosure, data can be stored much more compact (actually some 93% smaller compared to an index on a Lucene DBMS) and data can be searched/queried at some 1000× faster querying speeds, again compared to the Lucene in-memory index.

After having received a log line from an entity having the identity ID, the first step in constructing the probabilistic data structure is the tokenization of the log line into a list of atomized tokens T. As pointed out above, different tokenization techniques exist, and the particular technique is irrelevant. Each token is then subjected to a hashing operation such that the token T is represented by a token hash T #; the token hash may be a 4-byte value. Subsequently, the token map is checked whether the token hash is already contained in it. If not, the token hash value T # of the token T is added to the token map table. Typically, the adding is done by adding a new row at the bottom of the table and by writing the token hash into the column TokenHash, such that all unique token hashes of all log lines are eventually contained in the token map. For compactness, a token hash is contained only once in the token map, i.e. without any duplicates. Furthermore, a temporary entities list is constructed comprising the tuple (1, IDS #, IDS). In the tuple, the value "1" represents the token count 1, the field IDS is the ID of the token, and the hash value IDS # is set to the hash value of IDS. The temporary entities list may be used in a subsequent step. If the token hash T # is already contained in the token map table, then the pointer from the row in the token map table is followed to the respective row in the entities list table. The field IDS there is checked whether it contains the ID of the token being currently processed. If the ID is contained in IDS then no additional action needs to be taken and the next token is processed. Otherwise, the token count in the row is decreased by 1 and the field IDS is read out. Furthermore, the ID is added to the read-out list of entities IDS, a hash value IDS # is generated by hashing IDS, and the token count is set to 1. As described above, the tuple (1, IDS #, IDS) is written into a temporary entities list, which may be used later. The hashing of IDS, i.e. the list of the identities IDS, is preferably done by applying a commutative hash function. The commutative hash function allows the quick and computationally inexpensive generation of hash values IDS # for a list of identities IDS. Assuming that $IDS\#_1$ is the hash value for a first list of identities $IDS_1$, ID # is the hash value of ID, and that ID shall be added to the list of identities $IDS_1$, say "IDS:=$IDS_1$+ID", then the hash value IDS # of the enlarged list of identities IDS is XOR(IDS #1, ID #).

The next step in the construction is to check whether IDS # is already contained in the lookup map table. If IDS # is already contained then the link from the lookup map table to the entities list table is followed and the token count TC in this row is incremented by 1 and the address ADD of the row in the entities list is added to the token map. If IDS # is not contained in the lookup map, then the temporary entities list is added as a new row to the entities list, the address ADD of the new row is stored, the tuple (IDS #, ADD) is added to the lookup map and ADD is also added to the token map.

After performing all these steps for a single token, another token is being processed and after having processed all tokens of a log line, another log line is being processed.

According to one preferred embodiment of the disclosure, a commutative hash function is used for hashing.

In a preferred embodiment, the hash value IDS # of a list of identities $ID_1$, $ID_2$ is formed by IDS #:=XOR(Hashing($ID_1$), Hashing($ID_2$)).

During the construction of the probabilistic data structure it is preferred to read-in the field IDS # after the "step read field IDS", and in case the ID is not contained in IDS that the hashing of IDS into IDS # is performed by IDS #:=XOR (IDS #, Hashing(ID)).

In order to clean up unused memory during the construction of the probabilistic data structure it is beneficial to delete both the row in the lookup map pointing to an entities list having TC=0 and the row in the entities list having TC=0.

A computer implemented method for querying the probabilistic data structure for storing log lines constitutes the second aspect of the disclosure. For querying the uncompressed data structure only the Token Map table and the Entities List table are used; the Lookup Map is irrelevant.

In the first step during querying, a token hash T # is generated for the query token T. Note that the same hashing function used for storing log lines in the probabilistic data structure is used for querying.

In the next step, it is checked whether the token hash T # is contained in the token map. If the token map comprises T #, the link from the corresponding row in the token map to the entities list is followed and the field IDS is read-out. Finally, IDS is output to the query consumer. The query consumer may be an application, a function etc.

If, however, the token hash T # is not contained in the token map, then an empty list " " for IDS is output to the query consumer.

A computer implemented method for compressing the probabilistic data structure for storing log lines constitutes the third aspect of the disclosure. For compressing the data structure only the Token Map table and the Entities List table are used; the Lookup Map is irrelevant.

The compression of the probabilistic data structure reduces its size considerably, namely the token map by more than 75% of its size before compression, and the list of identities IDS in the entities list by more than 90%. The compression allows the probabilistic data structure to be loaded into the RAM or a RAM disk of a computer and consequently, to achieve very high querying speeds. Due to the small size of the data structure, multiple computers or CPUs can load the data structure and data retrieval/querying can be done in parallel.

The compression comprises three main steps, namely i. encoding the token hashes in the column TokenHash of the token map, ii. encoding the addresses in the column ADD of the token map, and iii. encoding the list of identities in the column IDS of the entities list.

In a preferred embodiment, a Minimal Perfect Hash Function (short MPHF), preferably the BBHash function, is used to encode the token hashes. The MPHF maps K token hashes to the value range [0,|K|−1], without any gaps or collisions and is therefore optimal in terms of size. The BBHash function is a preferred MPHF due to its simplicity and fast construction speed. In a typical example, a token hash is compressed to 3 bits.

In order to reduce the likelihood of hash collisions due to the compression of the token hashes, a number of signature bits, preferably the last 8 bits of an unencoded token hash, are added to the encoded token hash.

For compressing the addresses in the column ADD of the token map, an entropy encoding technique is used. In a first step, the addresses ADD in the token map are sorted according to the corresponding token count value TC in the entities list. Subsequently, the addresses of each MPHF encoded token are compressed according to their token count TC.

Preferably a Compressed Static Function is used to encode the token hashes T # and the addresses ADD in the token map.

For compressing the list of identities IDS in the entities list table, preferably Binary Interpolative Coding is used.

A computer implemented method for querying the compressed probabilistic data structure for storing log lines constitutes the fourth aspect of the invention.

During querying, the query token T is hashed first into a token hash T #. Subsequently, T # is hashed into T #* using a Minimal Perfect Hash Function. If T #* is contained in the compressed static function, then the signature bits in the row of the compressed static function are read out. If the signature bits are identical to the n least significant bits of T #, then the rank is read-out from the compressed static function and subsequently, IDS is read from the row "rank" in entities list. Note that as IDS is stored in encoded form, a decoding step needs to be performed in order to receive IDS. If the signature bits≠n least significant bits of T # then IDS:=" ", i.e. an empty set. Likewise, if T #* is not contained in the compressed static function then IDS:=" ". Finally, IDS is output to the query consumer.

Preferably the Minimal Perfect Hash Function is the BBHash function.

A file format for storing the compressed probabilistic data structure for storing log lines constitutes the fifth aspect of the invention.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
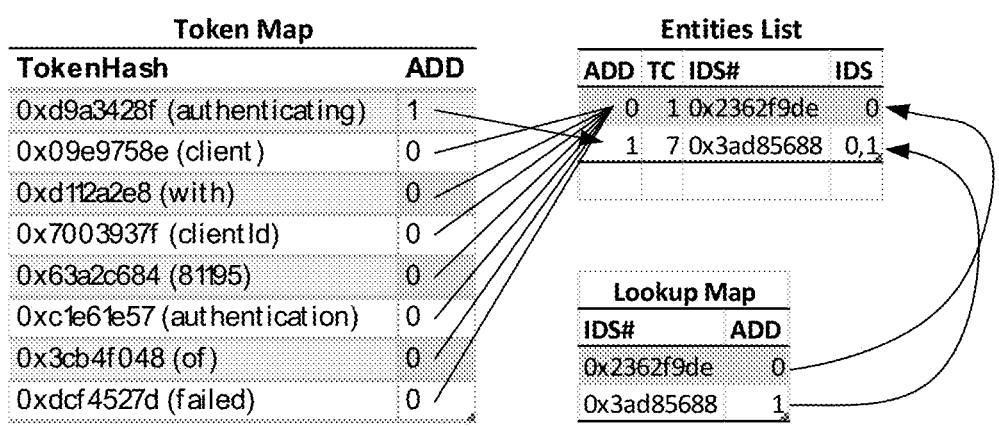
Figure 5:
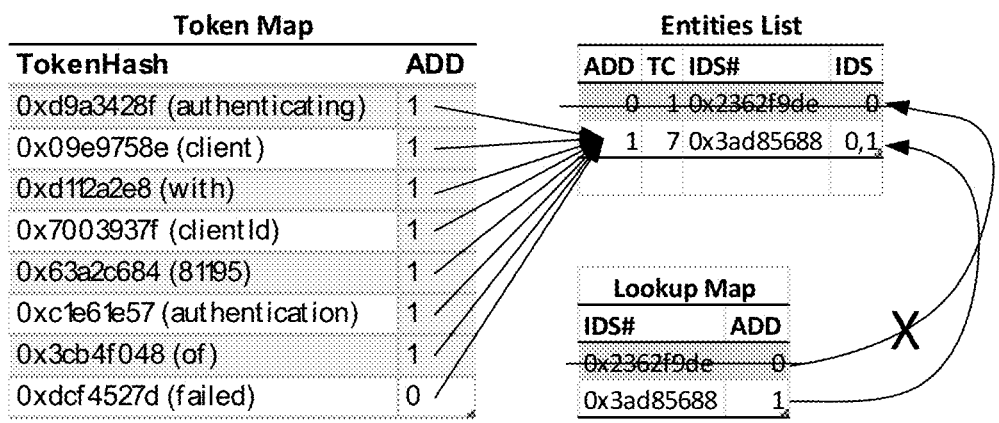
Figure 6:
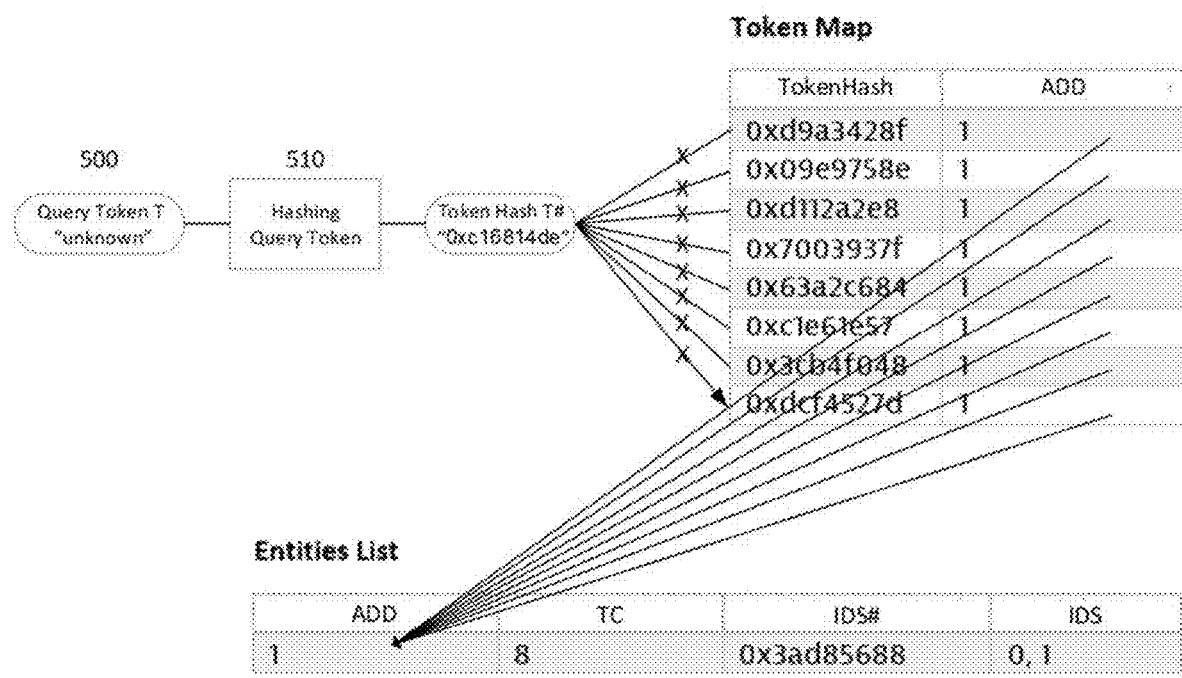
Figure 7:
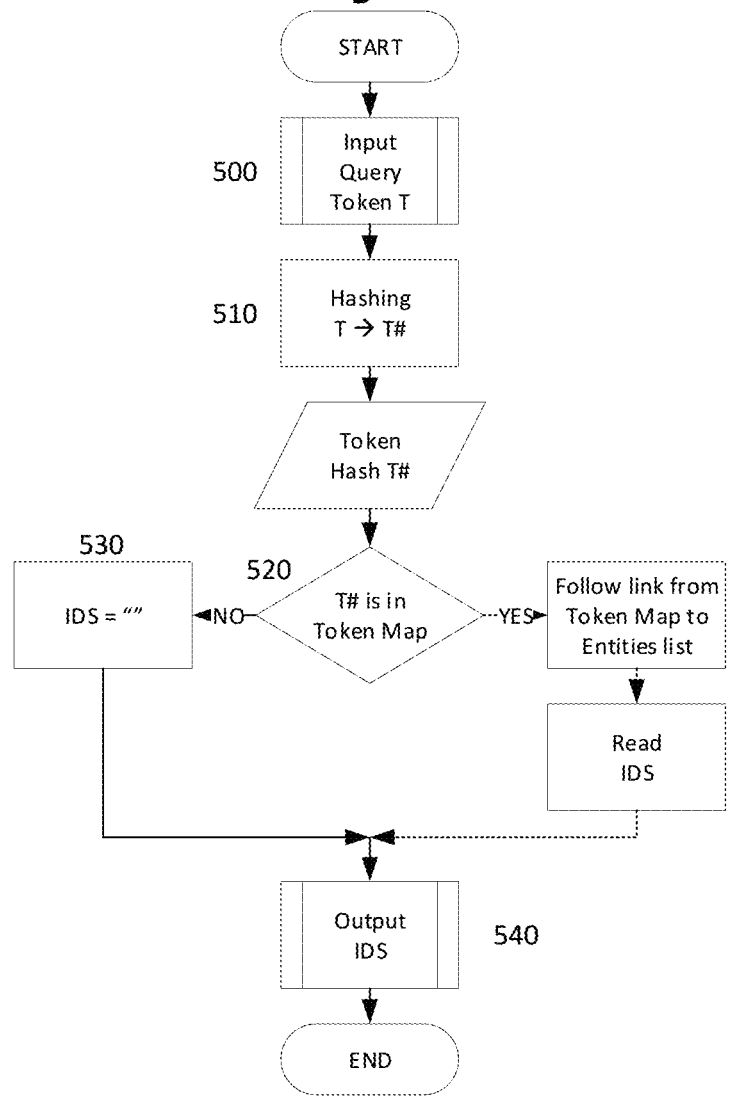
Figure 8:
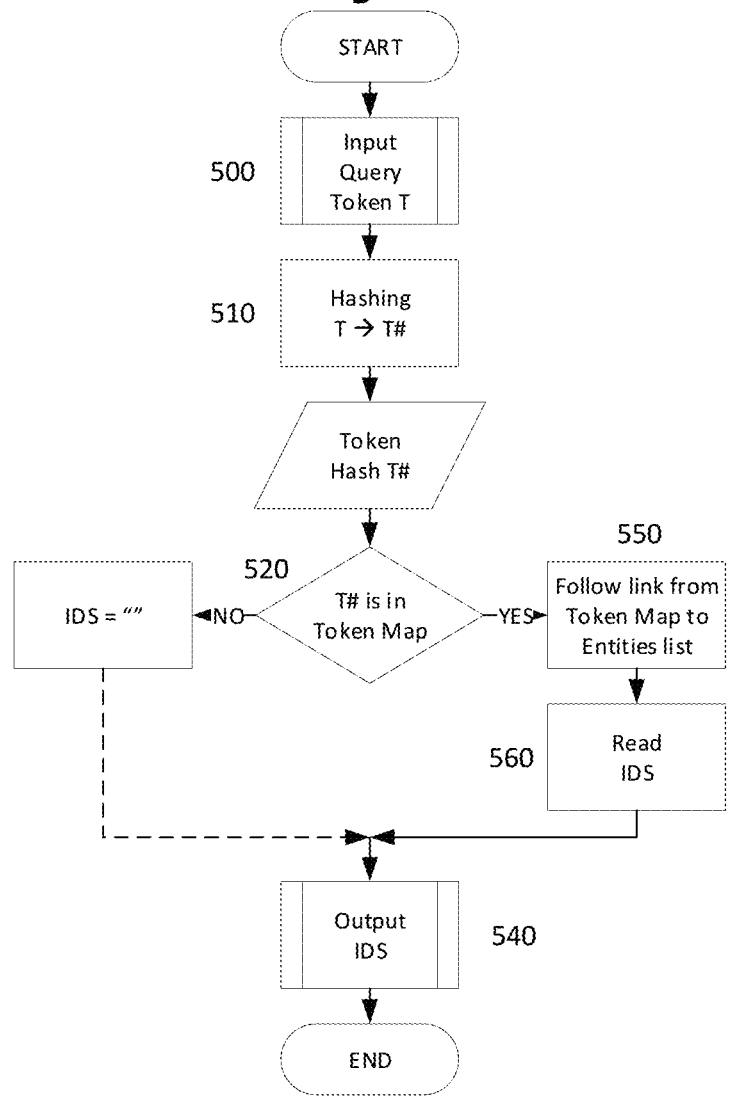
Figure 9:
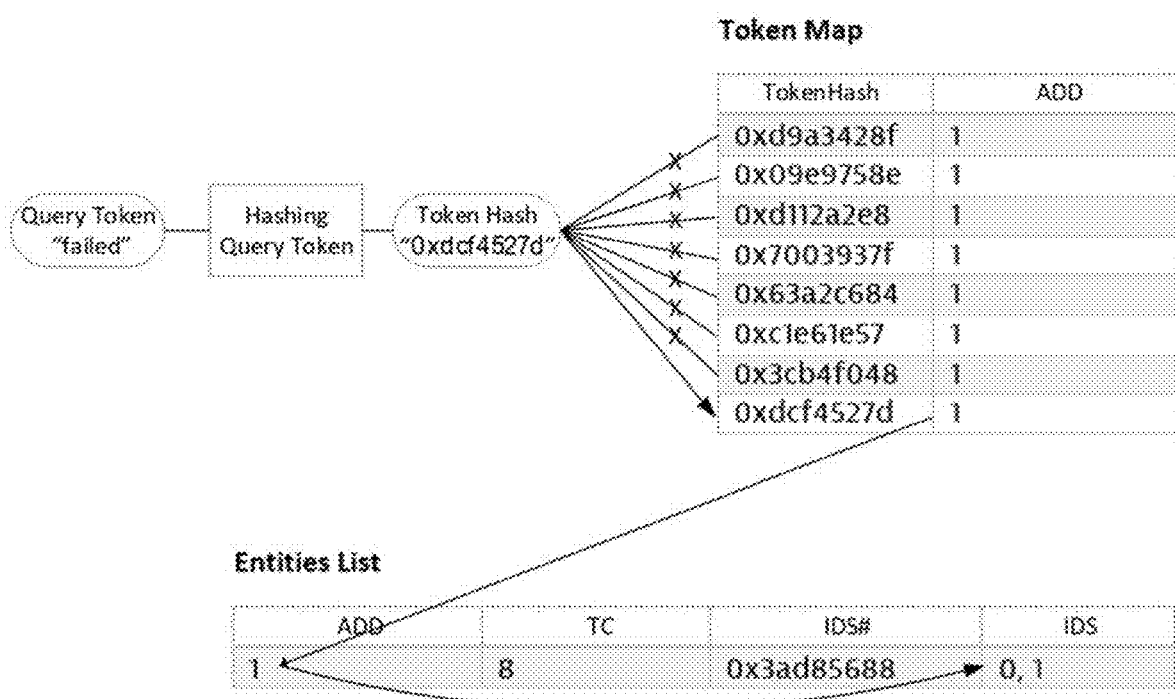
Figure 10:
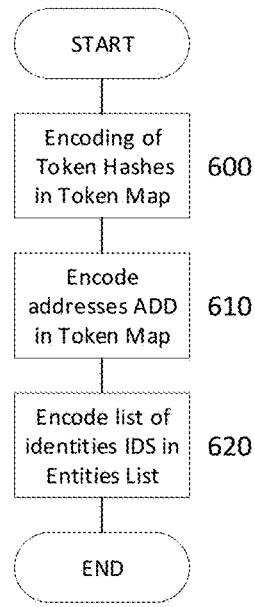
Figure 11:
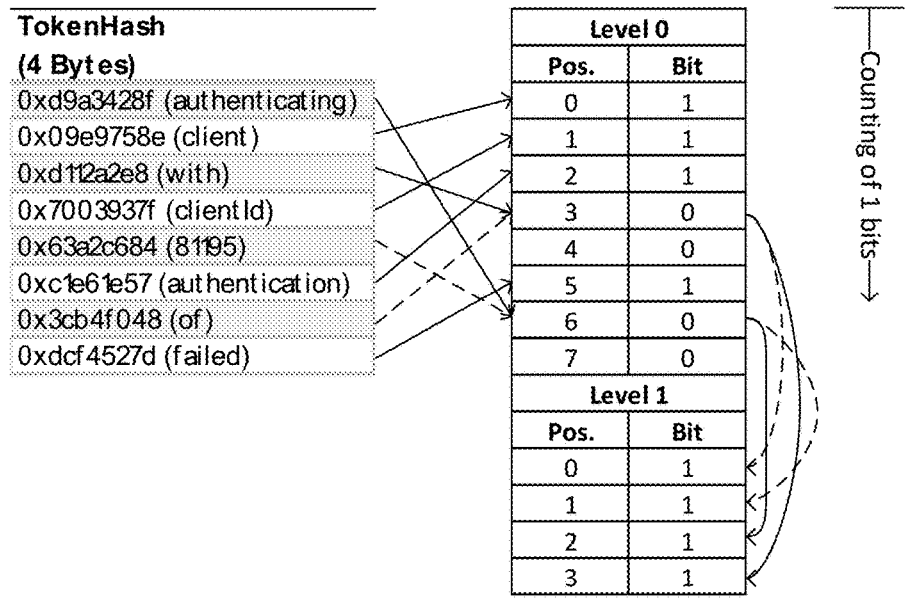
Figure 12:
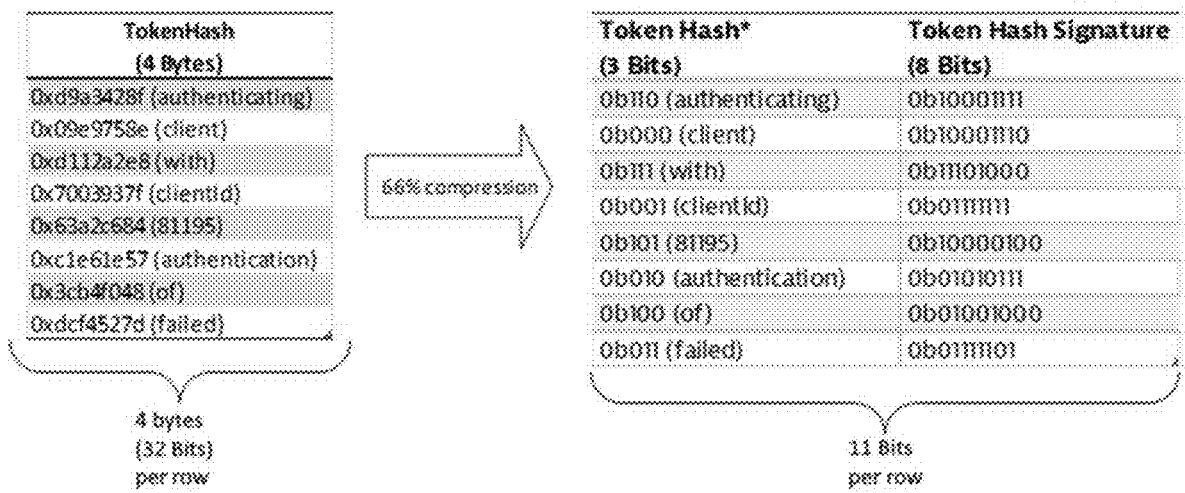
Figure 13:
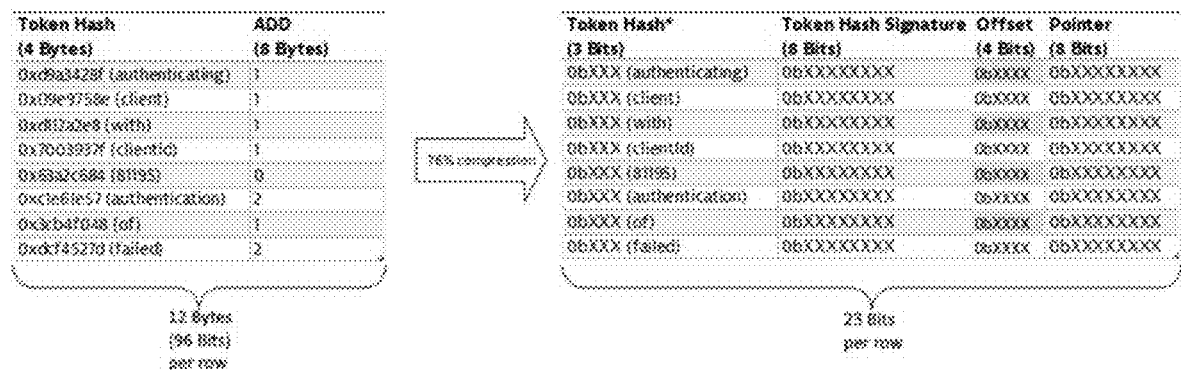
Figure 14:
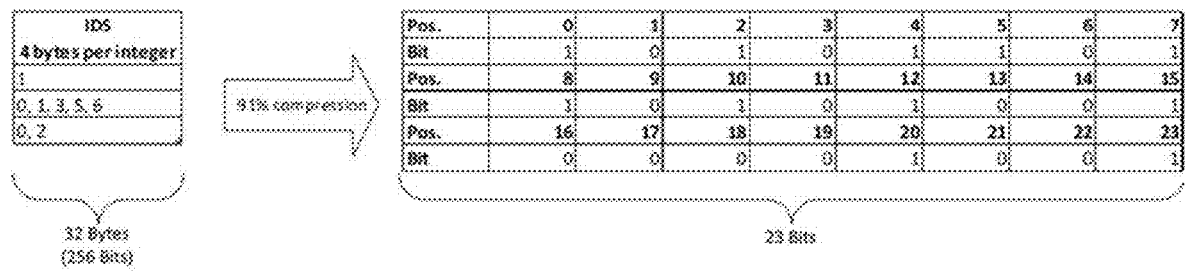
Figure 16:
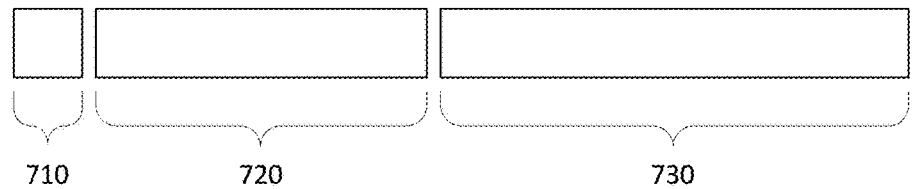

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 schematically shows two entities producing streams of log lines and a computer storing log lines to a probabilistic data structure, FIG. 2 shows the structure of the data tables during storing log lines to the probabilistic data structure, FIGS. 3a and 3b show the steps for storing log lines to the probabilistic data structure, FIGS. 4 and 5 show two statuses of the data tables during storing log lines to the probabilistic data structure, FIG. 6 shows a first scheme for querying the uncompressed probabilistic data structure, i.e. before compressing the probabilistic data structure, FIGS. 7 and 8 show the steps for querying the uncompressed probabilistic data structure, FIG. 9 shows a second scheme for querying the uncompressed probabilistic data structure, FIG. 10 shows the steps for compressing the probabilistic data structure, FIG. 11 shows a scheme for generating hash values for the token hashes by executing a Minimal Perfect Hash Function, FIG. 12 shows the compression ratio of the token hashes in the token map table by executing the Minimal Perfect Hash Function, FIG. 13 shows the compression ratio of the address column ADD in the token map table by executing a Compressed Static Function, FIG. 14 shows the compression ratio of the identities list IDS in the entities list table by executing a Binary Interpolative Coding, FIG. 15 show the steps for querying the compressed probabilistic data structure, i.e. after compressing the probabilistic data structure, and FIG. 16 shows a file format for storing the compressed probabilistic data structure on a disk or for loading it into the RAM of a computer.

Corresponding reference numerals indicate corresponding parts throughout the several views of the drawings.

DETAILED DESCRIPTION

Example embodiments will now be described more fully with reference to the accompanying drawings.

A first application example shows how a stream of log lines is added to an initially empty probabilistic data structure, how the data tables of the probabilistic data structure are iteratively updated when data is added, and how duplicates are handled.

FIG. 1 shows two computers 10, 20, namely a first computer 10 with ID 0 and a computer 20 with ID 1, producing two streams of log lines. It is to be understood that the log line L1 from computer 10 arrives at the computer 30, i.e. the computer 30 adding the log lines to the data structure 40, first and at that time, the computer is not aware of any data being received later. After the first log line L1, three more log lines L2 . . . L4 arrive at the computer 30. L1 and L2 originate at the computer 10 with ID 0, whereas L3 and L4 originate at the computer 20 with ID 1.

The following log lines L1 . . . L4, e.g. from an application, will be used in this example.

| | Log lines | ID |
|---|---|---|
| L1 | authenticating client with clientId 81195 | 0 |
| L2 | authentication of client 81195 failed | 0 |
| L3 | authenticating client with clientId 81195 | 1 |
| L4 | authentication of client 81195 failed | 1 |

Each log line is associated to an identity "ID", i.e. the ID of an entity, e.g. a specific application or container running on a server, producing the log line. The disclosure is not limited to log lines/messages from specific sources. As operating systems for clients and servers, applications (both locally installed, web based and hybrid), networks including the cloud, and containers (such as Docker or Kubernetes) etc. generate log messages during their operation, all these log lines can be stored in a database or storage system. The ID is used to identify log lines from a specific source/entity, e.g. to find and access them later in a database. The probabilistic data structure is used to add and subsequently quickly find a "keyword" (e.g. a token) in the database.

Generally, the entities 0 and 1 can be e.g. different applications on the same computer, or—as displayed in FIG. 1—can originate from two different computers 10, 20.

In a first step 100, the log line L1 is received by the computer 30. As L1 originates at the computer 10 having the ID 0, the log line L1 and the ID form a pair (L1, 0)=" (authenticating client with clientId 81195, 0)" (see block 110 in FIG. 3a).

In step 120, the log line L1 is split into individual tokens, in this case into n=5 tokens. This step is also called tokenizing the log line or tokenization. Different tokenization strategies can be applied at this step. In this example it is assumed that the tokens in the log lines are separated by white-space characters. As the disclosure does not concern tokenization, it is not limited to a specific tokenization strategy. Each token is then combined with the ID of the log line, which results in the following list of pairs:

L1
$\underbrace{(\underbrace{\text{authenticating}}_{\text{token}}, \underbrace{0}_{\text{ID}})}_{1^{st} \text{ pair}}, \underbrace{(\text{client}, 0)}_{2^{nd} \text{ pair}}, \underbrace{(\text{with}, 0)}_{3^{rd} \text{ pair}}, \underbrace{(\text{clientId}, 0)}_{4^{th} \text{ pair}}, \underbrace{(81195, 0)}_{5^{th} \text{ pair}}$ L2
$(\text{authentication}, 0), (\text{of}, 0), \underbrace{(\text{client}, 0)}_{3^{rd} \text{ pair}}, \underbrace{(81195, 0)}_{4^{th} \text{ pair}} \underbrace{(\text{failed}, 0)}_{5^{th} \text{ pair}}$ L3
$\underbrace{(\text{authenticating}, 1)}_{1^{st} \text{ pair}}, (\text{client}, 1), (\text{with}, 1), (\text{clientId}, 1), (81195, 1)$ L4
$(\text{authentication}, 1), (\text{of}, 1), (\text{client}, 1), (81195, 1)\underbrace{(\text{failed}, 1)}_{5^{th} \text{ pair}}$ The $1^{st}$ pair or pair 1 is schematically depicted in FIG. 3a. As FIG. 3 is too large to fit onto one page, the figure is split into two, namely FIG. 3a showing the top part and FIG. 3b showing the bottom part. A dotted and dashed line shows the split between the upper and the lower part.

In this application example, the mutable probabilistic data structure before compression comprises three data tables, namely a Token Map, an Entities List and a Lookup Map (see FIG. 2). FIG. 2 shows these tables with some data; however, the data being shown is not limiting. The term mutable means that the construction of the data structure is not yet finished, i.e. that more data may be added during the ongoing construction of the probabilistic data structure. The token map table comprises two columns, one column titled "TokenHash" containing the token hashes of the tokens and another column titled "ADD" containing addresses or pointers to respective rows in the entities list. The entities list table comprises four columns in this example, one column titled "ADD" containing addresses of the respective rows in the entities list. This column "ADD" is not a separate column as such as it contains the addresses of the rows in the entities list table only. As every row in a table inherently has an address, the address does not need to be stored separately in the entities list table. The second column titled "TC", which is short for token count, contains the numbers of tokens linked to or pointing to the respective row in the entities list. The third column titled "IDS #" contains the hash values of the column IDS, and the fourth column titled "IDS" contains a list of the identities, e.g. "0, 1". The lookup map table comprises two columns, one titled "IDS #" and another one titled "ADD", both as described above. All these data tables are initially empty. In addition to the three data tables, for some steps a Temporary Entities List is used.

During the process of storing log lines to the probabilistic data structure the Lookup Map is not strictly necessary, as it was introduced to improve performance only. In other words, it would be possible to search the column "IDS" of the entities list table, whether and where a specific list of identities IDS is present. As both the length of the entities list and the length of individual identities lists IDS may be different, searching has quadratic complexity $O(n^2)$ and the access time varies widely. In the application example, the lookup map contains the address ADD of a row in the entities list and consequently, searching IDS has constant complexity $O(1)$ and constant access time.

After tokenizing L1, each pair is added separately to the probabilistic data structure. The process is started with the $1^{st}$ pair of L1. In step 130, a 4-byte hash value is calculated for the token $T_1$ "authenticating" of the first pair, resulting in the pair (T #, ID). The hash values are represented by hexadecimal strings, for example:

| (T, ID) | → | (T#, ID) |
|---|---|---|
| (authenticating, 0) | → | (0xd9a3428f, 0) |

The hash value T # can be considered as a compact signature of the token T. The token "authenticating" has a length of 14 bytes, whereas the token hash is 4 bytes long. In this example, all token hashes T # have a length of 4 bytes, irrespective of the length of the token. Many hashing functions exist mapping a token to a 4-byte hash value, e.g. CRC-16.

In step 140, the token map is checked for the presence of the token hash "0xd9a3428f".

TABLE 1

Token Map

| TokenHash | ADD |
|---|---|

As the token map is initially empty (see Table 1), the token hash "0xd9a3428f" is not contained in the token map. Since the token map shall contain all unique token hashes being present in the data structure, the token hash T # is added to the token map in step 150. The address field ADD in the 1$^{st}$ row of the token map is left empty for the time being (see Table 2).

TABLE 2

Token Map

| Token Hash | ADD |
|---|---|
| 0xd9a3428f | |

In step 160, IDS is set to ID, i.e. IDS:="0". In step 170, the hash value IDS # for IDS is computed by applying a hash function to IDS. In our case, IDS # is "0x2362f9de". In step 175, the tuple (1, IDS #, IDS) is written to a temporary variable, called the temporary entities list, see Table 3:

TABLE 3

Temporary Entities list

| TC | IDS# | IDS |
|---|---|---|
| 1 | 0x2362f9de | 0 |

In step 180, it is checked whether the lookup map contains IDS #. Since the lookup map is initially empty, it does not contain 0x2362f9de.

TABLE 4

Lookup Map

| IDS# | ADD |
|---|---|

In step 190, the temporary entities list is added to the initially empty entities list table. Each row in the entities list table has an address ADD, which can be used to access the respective row in the entities list. In step 200, the variable ADD is set to the new row just added to the entities list table; in this example, the first row is assumed to have the address "0" (see Table 5).

TABLE 5

Entities List

| ADD | TC | IDS# | IDS |
|---|---|---|---|
| 0 | 1 | 0x2362f9de | 0 |

In step 210, IDS # and ADD are added to the lookup map (see Table 6), wherein ADD serves as a pointer to a specific row in the entities list.

TABLE 6

Lookup Map

| IDS# | ADD |
|---|---|
| 0x2362f9de | 0 |

Finally in step 220, the address ADD "0" is added to the row of the token map containing the token hash of the 1$^{st}$ token of L1. As ADD is contained in the token map, the entities list and the lookup map, all data tables are linked to each other, and corresponding entries can be found and accessed quickly. In order to improve the readability of this example, the token is subsequently printed in parenthesis next to the token hash in the token map. In reality, only the token hash is stored in the token map, not the token itself.

TABLE 7

Token Map

| TokenHash | ADD |
|---|---|
| 0xd9a3428f (authenticating) | 0 |

After incrementing the counter i by 1 to i=2 in step 230, the second pair of L1 is added to the data structure. First, the token "client" is hashed.

| (Token, ID) | → | (T#, ID) |
|---|---|---|
| (client, 0) | → | (0x09e9758e, 0) |

Since T # is not present in the token map, T # is added to the token map.

TABLE 8

Token Map

| TokenHash | ADD |
|---|---|
| 0xd9a3428f (authenticating) | 0 |
| 0x09e9758e (client) | |

Next, the temporary entities list is formed in an analogous manner to the previous token.

TABLE 9

Temporary Entities list

| TC | IDS# | IDS |
|---|---|---|
| 1 | 0x2362f9de | 0 |

In step 180 it is checked whether the lookup map already contains IDS #. In this case, the lookup map refers to the 1$^{st}$ row of the entities list having the address ADD "0". The address ADD is read from the lookup map (step 240).

In step 250 the token count TC in the entities list is increased by 1 to 2. Finally, in step 260 the address ADD of the 1$^{st}$ row in the entities list is written into the token map, such that also the second row refers to the 1$^{st}$ row of the entities list. The status of the resulting data structure is given below:

TABLE 10

Token Map

| TokenHash | ADD |
|---|---|
| 0xd9a3428f (authenticating) | 0 |
| 0x09e9758e (client) | 0 |

TABLE 11

| Entities list | | | |
|---|---|---|---|
| ADD | TC | IDS# | IDS |
| 0 | 2 | 0x2362f9de | 0 |

TABLE 12

| Lookup Map | |
|---|---|
| IDS# | ADD |
| 0x2362f9de | 0 |

The same steps are repeated for all remaining pairs of L1 and the $1^{st}$ and $2^{nd}$ pair of the second log line L2, resulting in the following state of the data structure:

TABLE 13

| Token Map | |
|---|---|
| TokenHash | ADD |
| 0xd9a3428f (authenticating) | 0 |
| 0x09e9758e (client) | 0 |
| 0xd112a2e8 (with) | 0 |
| 0x7003937f (clientId) | 0 |
| 0x63a2c684 (81195) | 0 |
| 0xc1e61e57 (authentication) | 0 |
| 0x3cb4f048 (of) | 0 |

TABLE 14

| Entities list | | | |
|---|---|---|---|
| ADD | TC | IDS# | IDS |
| 0 | 7 | 0x2362f9de | 0 |

TABLE 15

| Lookup Map | |
|---|---|
| IDS# | ADD |
| 0x2362f9de | 0 |

The next particularly interesting case happens when the $3^{rd}$ pair of L2 is added to the probabilistic data structure, since this specific combination of token and ID was already added to the data structure before.

In step 130 the token is transformed to the token hash value:

| (Token, ID) | → | (T#, ID) |
|---|---|---|
| (client, 0) | → | (0x09e9758e, 0) |

When checking the token map in step 140, the existing entry

| TokenHash | ADD |
|---|---|
| 0x09e9758e (client) | 0 | is found, therefore the YES path in the IF block 140 is executed. In step 300, the address ADD "0" of the $2^{nd}$ row of the token map is read in. Next, the field IDS in the $1^{st}$ row of the entities list having the address "0" is read-in (step 310) and it is checked, whether ID is contained in IDS (step 320). The check is performed by binary searching for the ID "0" within the IDS field. Since the identity ID "0" is contained in the respective row in the entities list, no other steps need to be done and the next token can be processed. After this, the status of the data structure is:

TABLE 16

| Token Map | |
|---|---|
| TokenHash | ADD |
| 0xd9a3428f (authenticating) | 0 |
| 0x09e9758e (client) | 0 |
| 0xd112a2e8 (with) | 0 |
| 0x7003937f (clientId) | 0 |
| 0x63a2c684 (81195) | 0 |
| 0xc1e61e57 (authentication) | 0 |
| 0x3cb4f048 (of) | 0 |

TABLE 17

| Entities list | | | |
|---|---|---|---|
| ADD | TC | IDS# | IDS |
| 0 | 7 | 0x2362f9de | 0 |

TABLE 18

| Lookup Map | |
|---|---|
| IDS# | ADD |
| 0x2362f9de | 0 |

The $4^{th}$ and $5^{th}$ pair of L2 are added to the data structure as described above. After this, the status of the data structure is as follows:

TABLE 19

| Token Map | |
|---|---|
| TokenHash | ADD |
| 0xd9a3428f (authenticating) | 0 |
| 0x09e9758e (client) | 0 |
| 0xd112a2e8 (with) | 0 |
| 0x7003937f (clientId) | 0 |
| 0x63a2c684 (81195) | 0 |
| 0xc1e61e57 (authentication) | 0 |
| 0x3cb4f048 (of) | 0 |
| 0xdcf4527d (failed) | 0 |

TABLE 20

| Entities list | | | |
|---|---|---|---|
| ADD | TC | IDS# | IDS |
| 0 | 8 | 0x2362f9de | 0 |

TABLE 21

| Lookup Map | |
|---|---|
| IDS# | IDS |
| 0x2362f9de | 0 |

After receiving the third log line L3 from the steam of log lines (step 100) and tokenizing it (step 120), the five pairs of the third log line L3 are added to the data structure, leading to some additional new cases.

In step 130, the hash for the 1$^{st}$ pair of L3 is calculated:

| (T, ID) | → | (T#, ID) |
|---|---|---|
| (authenticating, 1) | → | (0xd9a3428f, 1) |

When checking the token map for the presence of the token hash "0xd9a3428f", the address ADD "0" of the 1$^{st}$ row of the entities list is found. After reading the field IDS from the 1$^{st}$ row of the entities list linked to the token map and searching it whether it contains the ID "1", it is confirmed that the ID "1" is not present (step 320). Therefore, the NO path in the IF block 320 is executed.

In step 330, the ID "1" is added to the list of identities IDS, making IDS:="0,1". Step 340 specifies that the hash value IDS # for the list of identities IDS is calculated. The hash function used to update IDS # is a commutative hash function. A commutative hash function is not just computationally more efficient than a "normal" or non-commutative hash function, the resulting hash value is also independent from the order of hashing done. A function F:A×B→A is said to be commutative if $$F(F(a, b), c) = F(F(a, c), b), \text{ for all } a \in A \text{ and } b, c \in B$$

Coming back to our example: Applying a commutative hash function for hashing the list of identities IDS "0, 1" creates the same results as hashing the identities ID "1, 0". Hashing IDS "0, 1" creates the hash value IDS #0x3ad85688. Each identity ID is first hashed individually with a classic, non-commutative hash function. This ensures a uniform distribution of the resulting 4-byte hash values over the whole 4-byte value range. The hash values of the individual identities are then combined via a bitwise "XOR" operation, which is by definition commutative. The hash value of an identities list IDS containing only a single ID is equal to the hash value of the single ID. To "extend" a hash value IDS with another ID, the ID to be added is hashed individually first, and the resulting hash is then combined through the bitwise XOR operation with the previous hash value IDS #. This process guarantees a constant runtime for the update of an IDS #, independent of the number of identities in the entities list IDS.

Let us show this by way of an example: The hash value IDS # for the ID "0" is 0x2362f9d2 (see above) or binary "0010 0011 0110 0010 1111 1001 1101 0010". The hash value IDS # for the ID "1" is 0x19baaf5a or binary "0001 1001 1011 1010 1010 1111 0101 1010". Performing a binary "XOR" (or Exclusive Or) operation on both hash values results in 0x3ad85688 or binary "0011 1010 1101 1000 0101 0110 1000 1000" (see also below). This value is identical to the hash value IDS # for the list of identities IDS (0, 1).

| IDS | | IDS# | | | | | | | |
|---|---|---|---|---|---|---|---|---|---|
| 0 | a = | 0010 | 0011 | 0110 | 0010 | 1111 | 1001 | 1101 | 0010 |
| 1 | b = | 0001 | 1001 | 1011 | 1010 | 1010 | 1111 | 0101 | 1010 |
| | XOR(a, b) | 0011 | 1010 | 1101 | 1000 | 0101 | 0110 | 1000 | 1000 |
| 0, 1 | | 0011 | 1010 | 1101 | 1000 | 0101 | 0110 | 1000 | 1000 |

Since the commutative hash function is implemented by two noncommutative hash functions in combination with a bitwise XOR function, the hash value of the IDS, IDS #, is stored in both the temporary entities list as well as in the entities list. In other words, it is very beneficial to store IDS # for IDS, since—if another ID, say identity ID=b, is added to IDS, then the commutative hash value for the entities IDs (a,b) is simply the result of the bitwise XOR operation being performed on the IDS # value for the ID (a) and the IDS # for the ID (b). Please note that the ID (a) can be a single identity ID, such as "0", or already a (long) list of identities IDS.

| IDS# | IDS |
|---|---|
| xx | (a) |
| yy | (b) |
| XOR(xx, yy) | (a, b) |

The token count TC in the temporary entities list is set to one. The resulting temporary entities list is shown below (see step 350):

TABLE 22

| Temporary Entities list | | |
|---|---|---|
| TC | IDS# | IDS |
| 1 | 0x3ad85688 | 0, 1 |

In step 360 the token count in the entities list table is decreased by one, i.e. reducing TC from 8 to 7.

Subsequently step 180 checks whether the lookup map contains IDS #"0x3ad85688". As this is not the case, the NO path of the IF block 180 is executed. In step 190, the temporary entities list is added to the entities list table. ADD is set to the address of the new row in the entities list, in our case ADD=1. In addition, IDS # and ADD are added to the lookup map (step 210). Furthermore, in step 220, ADD is added to the token map to point to the new row 1 in the entities list. Performing all these steps, results in the following status of the probabilistic data structure (see also FIG. 4):

TABLE 23

Token Map

| TokenHash | ADD |
|---|---|
| 0xd9a3428f (authenticating) | 1 |
| 0x09e9758e (client) | 0 |
| 0xd112a2e8 (with) | 0 |
| 0x7003937f (clientId) | 0 |
| 0x63a2c684 (81195) | 0 |
| 0xc1e61e57 (authenticating) | 0 |
| 0x3cb4f048 (of) | 0 |
| 0xdcf4527d (failed) | 0 |

TABLE 24

Entities list

| ADD | TC | IDS# | IDS |
|---|---|---|---|
| 0 | 7 | 0x2362f9de | 0 |
| 1 | 1 | 0x3ad85688 | 0, 1 |

TABLE 25

Lookup Map

| IDS# | IDS |
|---|---|
| 0x2362f9de | 0 |
| 0x3ad85688 | 1 |

The above steps are repeated for all other pairs but the last pair of the last log line L4, leading to the following status of the data structure:

TABLE 26

Token Map

| TokenHash | ADD |
|---|---|
| 0xd9a3428f (authenticating) | 1 |
| 0x09e9758e (client) | 1 |
| 0xd112a2e8 (with) | 1 |
| 0x7003937f (clientId) | 1 |
| 0x63a2c684 (81195) | 1 |
| 0xc1e61e57 (authentication) | 1 |
| 0x3cb4f048 (of) | 1 |
| 0xdcf4527d (failed) | 0 |

TABLE 27

Entities list

| ADD | TC | IDS# | IDS |
|---|---|---|---|
| 0 | 1 | 0x2362f9de | 0 |
| 1 | 7 | 0x3ad85688 | 0, 1 |

TABLE 28

Lookup Map

| IDS# | IDS |
|---|---|
| 0x2362f9de | 0 |
| 0x3ad85688 | 1 |

The very last pair, i.e. the $5^{th}$ pair of L4, leads to another special case during the construction of the probabilistic data structure. As before, the token is first hashed into a 4-byte hash:

| (T, ID) | → | (T#, ID) |
|---|---|---|
| (failed, 1) | → | (0xdcf4527d, 1) |

As for some earlier tokens, the token hash 0xdcf4527d is contained in the token map and the token map is referencing to the $1^{st}$ row with ADD=0 of the entities list. After decrementing the token count by 1 to 0 in the entities list (step 360), the YES path of the IF block 370 is executed. In this path, the row in the entities list table with ADD=0 is removed (step 380) and the row having the entities ID hash 0x2362f9de in the lookup map is removed too (step 390). The unused rows in these tables can be reused later. The removal of the $1^{st}$ row in the entities list and the $1^{st}$ row in the lookup map are indicated by crossing out the rows in FIG. 5.

The final state of the data structure in this example is given below:

TABLE 29

Token Map

| TokenHash | ADD |
|---|---|
| 0xd9a3428f (authenticating) | 1 |
| 0x09e9758e (client) | 1 |
| 0xd112a2e8 (with) | 1 |
| 0x7003937f (clientId) | 1 |
| 0x63a2c684 (81195) | 1 |
| 0xc1e61e57 (authentication) | 1 |
| 0x3cb4f048 (of) | 1 |
| 0xdcf4527d (failed) | 1 |

TABLE 30

Entities List

| ADD | TC | IDS# | IDS |
|---|---|---|---|
| 1 | 8 | 0x3ad85688 | 0, 1 |

TABLE 31

Lookup Map

| IDS# | ADD |
|---|---|
| 0x3ad85688 | 1 |

Instead of storing the identities IDs in the column IDS of the entities list as a list of separate identities (e.g. the identities 0 and 1 in Table 30 above), the identities can also be stored in a bit array. In this case, a maximum number of identities is defined, e.g. 4096 identities, and a bit array of corresponding length is allocated (for storing max. 4096 different identities, only 12 Bytes are required). So in order to store the identities 0 and 1 in a 4096-bit array corresponding to the entries 0 and 1 of Table 30, only the bits at position 0 and 1 are set to 1 and all other bits of the bit array are set to 0. The alternative representation of identities IDs in the entities list IDS is particularly suitable for densely populated identities lists IDS since e.g. a list of 256 identities, where each identity is stored by a 2-byte integer value, already takes up the same amount of memory as a 512-Byte bit array capable of storing 4096 different identities in the entities list IDS.

According to another embodiment of the disclosure, the size of the mutable probabilistic data structure is kept within a size limit, e.g. a limit of 32 MB. Once the size in memory of the mutable data structure exceeds the size limit, the data structure is compressed into a immutable data structure which is written to disk. Additional data is written into an additional, initially empty data structure. This produces a segmented probabilistic data structure. It is evident that querying the segmented probabilistic data structure involves querying of all segments and merging of the query results from the individual segments.

In the next application example it will be demonstrated how queries are executed on the mutable data structure as constructed above. The following state of the data structure will be assumed. The lookup map is irrelevant for querying:

TABLE 32

Token Map

| TokenHash | ADD |
| --- | --- |
| 0xd9a3428f (authenticating) | 1 |
| 0x09e9758e (client) | 1 |
| 0xd112a2e8 (with) | 1 |
| 0x7003937f (clientId) | 1 |
| 0x63a2c684 (81195) | 1 |
| 0xc1e61e57 (authentication) | 1 |
| 0x3cb4f048 (of) | 1 |
| 0xdcf4527d (failed) | 1 |

TABLE 33

Entities List

| ADD | TC | IDS# | IDS |
| --- | --- | --- | --- |
| 1 | 8 | 0x3ad85688 | 0, 1 |

Every query starts with a list (including a list with a single element) of query tokens T for which the matching identities IDS are accessed in the probabilistic data structure; the query consumer is notified about the matching identities IDS for the queried tokens by outputting IDS. In case the hashes of the query tokens are not contained in the token map, an empty list of identities IDS is output to the query consumer. For some queries it is required that the query consumer indicates whether the query should be continued or aborted. When a query is aborted, the remaining query tokens will not be processed. Query consumers can combine the identities IDS of different rows of the entities list by the application of Boolean logic. For example, a query consumer might only be interested in identities which appear in all rows of the entities list of the queried tokens. In this case, the query performance is improved by aborting the query once the intersection of the processed entities lists is empty.

In case where multiple query tokens reference the same row of the entities list, the identities IDS will be passed to the query consumer only once. This deduplication of lists during querying is a unique capability of the probabilistic data structure according to the invention and is possible because lists of identities IDS are kept only once in the data structure. This improves query performance considerably by reducing the number of identities which need to be decoded and processed. Deduplication does not influence the set of matching identities if the identities of different entities lists are combined through Boolean logic.

FIGS. 6 and 7 show a first application example for querying, when the hash value of a single token is not contained within the token map.

After inputting the query token T in step 500, the token hash T # is calculated in step 510. The hash function used during querying is the same hash function used during the construction of the probabilistic data structure.

| Token T | → | Token hash T# |
| --- | --- | --- |
| unknown | → | 0xc16814de |

In step 520, a lookup is performed within the Token Map for the calculated token hash T #. As the token map does not contain T #, IDS is set to be an empty list, i.e. IDS:=" " (step 530), and in step 540 an empty list of identities is output to the query consumer. In FIG. 7, the YES path of the IF block 520 is displayed dotted as this path it is not taken. Since only one query token was involved in this query, the query is finished.

FIGS. 8 and 9 illustrate a second application example for querying. In this case, the query tries to access the identities IDS of a single token "failed" which is contained within the token map. In step 510, the token hash T # is calculated for the query token T.

| Token T | → | Token hash T# |
| --- | --- | --- |
| failed | → | 0xdcf4527d |

In this case, the token map contains an entry for the queried token hash and refers to the row having the address ADD "1" in the entities list. In steps 550 and 560, the row of the entities list with ADD "1" is accessed and IDS="0, 1" is read in. In step 540, the matching IDS are output to the query consumer.

Finally, a more complex query with multiple query tokens is presented. In step 510, the token hashes T # of the individual query tokens T are calculated:

| Token T | → | Token hash T# |
| --- | --- | --- |
| client | → | 0x09e9758e |
| failed | → | 0xdcf4527d |
| unknown | → | 0xc16814de |
| 81195 | → | 0x63a2c684 |

The token map contains an entry for the first token hash "0x09e9758e", pointing to the row of the entities list with ADD "1". The identities IDS "0" and "1" are output to the query consumer. Let's assume the query consumer indicates to continue the query. The token map also has an entry for the second token hash "0xdcf4527d", again pointing to the same row of the entities list. Since the identities IDS were already output to the query consumer, they are not output again. In this case, the query consumer cannot provide an indicator for the query continuation and the query is continued by default.

For the third token hash—"0xc16814de"—the token map does not contain an entry and an empty list " " of identities IDS is output to the query consumer. Let's assume the query consumer indicates to abort the query. The query execution stops and the last query token "81195" is not processed anymore.

The compression of probabilistic data structure by transforming it from a mutable probabilistic data structure into an immutable probabilistic data structure designed for long term storage will be demonstrated in the next two application examples. The term mutable means that the construction of the data structure is not yet finished, i.e. that additional log lines or tokens may be added to the data structure. Contrary to this, the term immutable means that the construction of the probabilistic data structure is finished, and no additional log lines/tokens are going to be added to the data structure. By finishing the construction of the data structure or in other words, allowing the data structure to become immutable at some time, enables the invention to employ a multitude of optimization strategies aimed at reducing the size on disk of the data structure. The probabilistic data structure may be declared finished e.g. after a certain period of time, e.g. after 1 day, or after the size of the mutable data structure reaches a size limit. In both cases, the previous/earlier data structure will be declared immutable and additional log lines/tokens will be added to a new probabilistic data structure.

FIG. 10 shows that the compression of the probabilistic data structure can be separated into three main parts, viz. i) encoding the column TokenHash containing token hashes in the token map (step 600), ii) encoding the column ADD containing pointers from the token map to the entities lists (step 610), and iii) encoding of the list of identities IDS in the entities list (step 620).

We will assume the following state for the token map and entities list, which will subsequently be transformed into the immutable probabilistic data structure. The state of the lookup map does not matter during compression.

TABLE 34

Token Map

| TokenHash | ADD |
|---|---|
| 0xd9a3428f (authenticating) | 1 |
| 0x09e9758e (client) | 1 |
| 0xd112a2e8 (with) | 1 |
| 0x7003937f (clientId) | 1 |
| 0x63a2c684 (81195) | 0 |
| 0xc1e61e57 (authentication) | 2 |
| 0x3cb4f048 (of) | 1 |
| 0xdcf4527d (failed) | 2 |

TABLE 35

Entities List

| ADD | TC | IDS# | IDS |
|---|---|---|---|
| 0 | 1 | 0xfbf1402a | 1 |
| 1 | 5 | 0x5a140182 | 0, 1, 3, 5, 6 |
| 2 | 2 | 0xe0eb777a | 0, 2 |

For the encoding of the 4-byte token hashes (column TokenHash), we are using an algorithm from the class of "Minimal Perfect Hash Functions" (short MPHF). A MPHF maps a static set K of keys (our token hashes) to the value range $[0,|K|-1]$, without any gaps or collisions. The information theoretic space lower bound for an MPHF is $\log_2 e \approx 1.44$ bits per key, while most practical implementations achieve roughly 3 bits per key. As a tradeoff, the MPHF usually returns an arbitrary value within the value range $[0,|K|-1]$ when accessed with a key which is not included in the static set K.

While any MPHF implementation could be used for the token hash encoding, the BBHash algorithm is used in this example due to its simplicity and fast construction speed.

To start the construction of the BBHash structure, we need to create a bit set. In the simplest case, the length of the bit set is set equal to the number of token hashes in our token map. This first bit set is called "level 0". As our token map contains 8 token hashes, "level 0" has eight bits, labeled 0 to 7. Initially, all bits are set to zero.

TABLE 36

BBHash Level 0 - Initial setting

| Position | 0 | 1 | 2 | 3 | 4 | 5 | 6 | 7 |
|---|---|---|---|---|---|---|---|---|
| Bit | 0 | 0 | 0 | 0 | 0 | 0 | 0 | 0 |

Each token hash now needs to be mapped to a position within level 0. Usually, a hash function is first applied to the key, to ensure a uniform distribution, and then a modulo operation is used to map the hashed key to a position. Since our token hashes are already uniformly distributed, this step can be skipped for the first level. Let us assume that the token hashes are mapped to the following positions:

| TokenHash → | Position |
|---|---|
| 0xd9a3428f → | 6 |
| 0x09e9758e → | 0 |
| 0xd112a2e8 → | 3 |
| 0x7003937f → | 1 |
| 0x63a2c684 → | 6 |
| 0xc1e61e57 → | 2 |
| 0x3cb4f048 → | 3 |
| 0xdcf4527d → | 5 |

In the next step, a bit in level 0 is set to "1", if exactly one token hash maps its position. This results in the following state for level 0. If more than one token hash maps to some position, a collision occurs and the bit in level 0 stays zero.

TABLE 37

BBHash Level 0

| Position | 0 | 1 | 2 | 3 | 4 | 5 | 6 | 7 |
|---|---|---|---|---|---|---|---|---|
| Bit | 1 | 1 | 1 | 0 | 0 | 1 | 0 | 0 |

For all token hashes involved in collisions (i.e. token hashes 0xd112a2e8 and 0x3cb4f048 both pointing to position 3, and token hashes 0xd9a3428f and 0x63a2c684 both pointing to position 6), another level is constructed. This process of creating levels will be repeated until no more collisions occur. Since four collisions occurred in level 0, level 1 will have a size of four bits, again initially set to zero.

TABLE 38

| BBHash Level 1 - Initial setting | | | | |
|---|---|---|---|---|
| Position | 0 | 1 | 2 | 3 |
| Bit | 0 | 0 | 0 | 0 |

Let's assume the collided token hashes map to the following positions within level 1.

| Token hash → | Position |
|---|---|
| 0xd9a3428f → | 2 |
| 0xd112a2e8 → | 3 |
| 0x63a2c684 → | 1 |
| 0x3cb4f048 → | 0 |

These positions result in the following state for level 1:

TABLE 39

| BBHash Level 1 | | | | |
|---|---|---|---|---|
| Position | 0 | 1 | 2 | 3 |
| Bit | 1 | 1 | 1 | 1 |

Since level 1 has no more collisions, no further level needs to be added, resulting in the following final state for all levels:

TABLE 40

| BBHash Levels 0 and 1 | | | | | | | | |
|---|---|---|---|---|---|---|---|---|
| Level | | | | | | | | |
| 0 | Position | 0 | 1 | 2 | 3 | 4 | 5 | 6 | 7 |
|   | Bit | 1 | 1 | 1 | 0 | 0 | 1 | 0 | 0 |
| 1 | Position | 0 | 1 | 2 | 3 | | | | |
|   | Bit | 1 | 1 | 1 | 1 | | | | |

The minimal perfect hash value (abbreviated as MPH or TokenHash*) for a token hash T can be directly inferred from these levels. Let's look at an example for the token hash 0x63a2c684 of the token "81195":

First, the token hash will be mapped to a position within level 0, exactly as during the construction of the levels. The token hash maps to position 6 within level 0. Since the bit at position 6 is zero, the algorithm must proceed to level 1. Now, the token hash is mapped to position 1 within level 1. Since no collision occurs at the mapped position at level 1, a match has been found and the bit at position 1 is set to one. The MPH of the token hash 0x63a2c684 is now defined as the number of bits set one until a match is found (in this case, finding the position 1 in level 1), including the 1-bits from all lower levels. In other words, as the match for the token hash 0x63a2c684 is at level 1, position 1, the "1" bits until that position need to be summed up. Starting at position 0 at level 0, four bits are set at 1 at level 0, and continuing at level 1, 1 more bit set at 1 needs to be added until the position 1 at level 1 is reached. This results in a total of 5 bits set at 1. Therefore, the token hash 0x63a2c684 is mapped to 5. The counting of bits is also shown in FIG. 11.

Let's do one more example. For the token hash 0xd112a2e8 (token with) no match can be found on level 0, however, a match is found on level 1 at position 3. Summing up 3 bits set at 1 at level 0 and 3 bits (position 3) at level 1, results in a total of 7 bits set at 1. Therefore, the token hash 0xd112a2e8 is mapped to 7.

If this process would not encounter a 1-bit throughout all levels, the accessed token hash wasn't included in the initial key set used for the construction of the levels.

Applying these steps to all token hashes, results in the following MPHs (see also column Token Hash* in FIG. 12):

| TokenHash T# → | MPH = T#* (Decimal notation) |
|---|---|
| 0xd9a3428f → | 6 |
| 0x09e9758e → | 0 |
| 0xd112a2e8 → | 7 |
| 0x7003937f → | 1 |
| 0x63a2c684 → | 5 |
| 0xc1e61e57 → | 2 |
| 0x3cb4f048 → | 4 |
| 0xdcf4527d → | 3 |

The counting of preceding 1-bits needs to be done whenever the MPH of a token hash is needed. This process can be sped up by pre-calculating these counts for some of the bit positions in regular intervals. This ensures that only the bits between two pre-calculated intervals need to be counted when the MPH for a token hash is accessed. Data structures which pre-calculate the sums of preceding values within sequences are sometimes referred to as "prefix sum".

As explained above, an MPHF will in most cases produce a random MPH when accessed with a token hash which wasn't included in the initial key set. This is also true for the BBHash. For the probabilistic data structure, we need to be able to determine, at least with a certain probability, whether a token hash, accessed for example during a query, has been added to the data structure at all.

This is achieved by storing a configurable number of the least-significant bits of each token hash, referred to as "signature bits". The signature bits of all token hashes in the token map are stored within one bit set, where the MPH of a token hash determines the position of the signature bits within the bit set.

A configuration of 8 signature bits per token hash would result in the following mapping between token hashes, MPH (both in decimal and binary notation), and signature bits (both in hexadecimal and binary notation):

TABLE 41

| MPH and Signature Bits | | | | |
|---|---|---|---|---|
| TokenHash | T#* Dec. | T#* Bin. | Signature Bits Hex. | Signature Bits Bin. |
| 0x09e9758e | 0 | 000 | 0x8e | 1000 1110 |
| 0x7003937f | 1 | 001 | 0x7f | 0111 1111 |
| 0xc1e61e57 | 2 | 010 | 0x57 | 0101 0111 |
| 0xdcf4527d | 3 | 011 | 0x7d | 0111 1101 |
| 0x3cb4f048 | 4 | 100 | 0x48 | 0100 1000 |
| 0x63a2c684 | 5 | 101 | 0x84 | 1000 0100 |
| 0xd9a3428f | 6 | 110 | 0x8f | 1000 1111 |
| 0xd112a2e8 | 7 | 111 | 0xe8 | 1110 1000 |

When accessing the MPH of a token hash, the least-significant bits of the token hash are compared to the signature bits. If they aren't equal, the queried token hash was not included in the probabilistic data structure. Using 8 signature bits would result in a chance of ~99.6% to correctly recognize that a queried token hash is not included within the data structure. In practice, the MPHF and signature bits result in a space usage of ~11 bits per stored token hash, which is a significant reduction from the 4 bytes of the token hashes and an even larger reduction when compared to the size of the original tokens.

The possibility to use an MPHF for the encoding of the tokens is a direct result of the design choice to accept a small false-positive rate during queries and represents a unique capability of our invention compared to other inverted indices. The step 600 in FIG. 10 compresses the token hashes by some 66% (see also FIG. 12).

After building the optimized representation of the tokens, the references ADD between the individual token hashes in the token map and their associated identities lists IDS are encoded. Two facts enable us to reduce the number of required bits per reference. First, the number of unique entities list IDS is typically orders of magnitude lower than the number of unique tokens within the probabilistic data structure. Second, entities lists are usually not equally often referenced by tokens and as soon as values follow a non-uniform distribution, compression techniques based on their entropy can be applied.

As the first step in the encoding of the references, the entities lists are ordered by the number of tokens referencing them. This reference count is tracked in the column "Token-Count" of the entities lists. The position of an entities list in this ordered sequence is referred to as its "rank". Entities lists with a higher token count will get a lower rank. If multiple entities lists have the same token count, the ordering between them does not matter. In our example, we would get the following ranks for the entities lists.

| Rank | → | ADD |
|---|---|---|
| 0 | → | 1 |
| 1 | → | 2 |
| 2 | → | 0 |

Instead of storing a reference to its entities list for every token, the algorithm will store the rank of the referenced entities list. Since lower ranks will be stored more often, binary code words with fewer bits to are assigned to them. This type of frequency-based code word assignment is typically referred to as entropy coding. The code word will use the minimal number of bits necessary to encode the rank. Ranks are not uniquely decodable. The table below shows the final assignment between ADD and the rank, both in decimal and binary notation.

TABLE 42

| Rank Encoding | | |
|---|---|---|
| ADD | Rank Dec. | Rank Bin. |
| 0 | 2 | 10 |
| 1 | 0 | 0 |
| 2 | 1 | 1 |

The ability to use entropy encoding for ranks is a direct consequence of the probabilistic data structure design according to the invention and is possible because of the deduplication done for entities lists.

Based on this mapping between the address ADD of a row in the token map, the rank and the binary code word, the algorithm can encode the entities list references for each token hash by inserting the according binary code words into a bit sequence. The position of the binary code word for a token hash must be determinable through the MPH/Token Hash* of the token hash. Since the binary code words have a variable length, an additional support data structure is used to determine the position of the binary code word for a token hash within this bit sequence.

To achieve this, the length of the binary code word of every token hash is added to a prefix sum data structure. Since the number of ranks is equal to the number of entities lists, the length of the longest binary code word is given by $\lceil \log_2 |entities\_lists| \rceil$ and the number of bits necessary to encode the length of the longest binary code word is given by $\lceil \log_2 \lceil \log_2 |entities\_lists| \rceil \rceil$. In our example, the longest binary code word requires 2 bits to encode the highest rank 2 and therefore the length of each binary code word can be encoded using 2 bits.

The prefix sum for the encoded ranks can already be initialized to the correct size, because it is known to need a value for each token hash and the number of bits needed for every value is also known. The values of the prefix sum will be initialized to zero.

TABLE 43

| Rank Offset Prefix Sum - Initial Setting | | | | | | | | |
|---|---|---|---|---|---|---|---|---|
| Position | 0 | 1 | 2 | 3 | 4 | 5 | 6 | 7 |
| Value | 0 | 0 | 0 | 0 | 0 | 0 | 0 | 0 |
| Sum | 0 | 0 | 0 | 0 | 0 | 0 | 0 | 0 |

Note that the "values" within the prefix sum data structure need to be stored, while the "sums" can be inferred from the values. Only some of the sums will be stored to get a good tradeoff between required storage space and access times for sums. The sums are defined as the sum of all values before the position of the sum. The "values" within the prefix sum data structure correspond to the binary code word lengths.

As the first step, the token hash 0xd9a3428f is mapped to its MPH, which is 6, and its address ADD is resolved, which is 1. The entities list ID 1 can be mapped to rank 0 and the binary code word "0". The length of the binary code word is inserted into the prefix sum data structure at position 6, defined by the MPH, resulting in the following state.

TABLE 44

| Rank Offset Prefix Sum | | | | | | | | |
|---|---|---|---|---|---|---|---|---|
| Position | 0 | 1 | 2 | 3 | 4 | 5 | 6 | 7 |
| Value | 0 | 0 | 0 | 0 | 0 | 0 | 1 | 0 |
| Sum | 0 | 0 | 0 | 0 | 0 | 0 | 0 | 1 |

Repeating these steps for every token in the token map, will result in the following state for the prefix sum data structure:

TABLE 45

| Rank Offset Prefix Sum | | | | | | | | |
|---|---|---|---|---|---|---|---|---|
| Position | 0 | 1 | 2 | 3 | 4 | 5 | 6 | 7 |
| Value | 1 | 1 | 1 | 1 | 1 | 2 | 1 | 1 |
| Sum | 0 | 1 | 2 | 3 | 4 | 5 | 7 | 8 |

Based on the prefix sums, it is possible to iteratively encode the ranks of all token hashes into a consecutive bit sequence. First, we will initialize the bit sequence to the required size. The size can be calculated by adding the last sum within the prefix sum data structure to the last value. In our example, 9 bits will be needed to encode all binary rank code words.

TABLE 46

Encoded Ranks - Initial Setting

| Position | 0 | 1 | 2 | 3 | 4 | 5 | 6 | 7 | 8 |
|---|---|---|---|---|---|---|---|---|---|
| Bit | 0 | 0 | 0 | 0 | 0 | 0 | 0 | 0 | 0 |

To start, we again get the MPH (6) and binary rank code word (0) for the first token hash 0xd9a3428f, exactly as before. Then, the sum at the position equal to the MPH is fetched from the prefix sum data structure, which is 7. This sum determines how many bits will be needed to encode the binary rank code words for all token hashes with a lower MPHF than the current one. In turn, this means that the binary rank code word of the current token hash can be written to position 7 in the bit sequence, resulting in the following state (the modified bits are highlighted as bold text).

TABLE 47

Encoded Ranks

| Position | 0 | 1 | 2 | 3 | 4 | 5 | 6 | 7 | 8 |
|---|---|---|---|---|---|---|---|---|---|
| Bit | 0 | 0 | 0 | 0 | 0 | 0 | 0 | 0 | 0 |

Repeating the same procedure for all other token hashes results in the following bit sequence for the encoded ranks.

TABLE 48

Encoded Ranks

| Position | 0 | 1 | 2 | 3 | 4 | 5 | 6 | 7 | 8 |
|---|---|---|---|---|---|---|---|---|---|
| Bit | 0 | 0 | 1 | 1 | 0 | 1 | 0 | 0 | 0 |

Together, the encoded ranks and the rank offset prefix sum allow the mapping from the MPH value for a token hash to the rank of its entities list.

The combination of a MPHF, signature bits and entropy coded values is referred to as a "Compressed Static Function" in literature. The usage of a compressed static function for the encoding of a probabilistic data structure is a unique feature of the invention. In the 1st and 2nd step of compressing the probabilistic data structure, the size reduced compressed by some 76% (see FIG. 13).

Two pieces are still missing for the compression of the probabilistic data structure. First, a storage format for the entities lists is needed and second, a mapping from the rank of an entities list to its storage position is required. We will start by explaining the storage format for the entities lists.

First, the token count and the hash value IDS # of the list of identities IDS do not have to be stored, as they are only required for the entities list deduplication during the construction of the mutable probabilistic data structure. The IDS lists are available as a sorted list of unique, positive integer values. "Binary Interpolative Coding" (abbreviated as BIC) is a specialized algorithm for the encoding of such lists, and we use it for the encoding of the identities lists IDS. However, any algorithm capable of encoding lists of integers could be used.

The entities lists IDS are encoded in ascending order of their ranks. Therefore, we will start with encoding the entities list with entities list ID "1", containing the identities "0, 1, 3, 5, 6".

In addition to the integer sequence, BIC requires an initial value range. No element in the integer sequence must be smaller than the lower bound of the value range or larger than the upper bound. Within the probabilistic data structure, the natural lower bound is zero, as negative identities IDS aren't allowed, and identities are supposed to start at zero and increase monotonically. For the upper bound, the highest identity within the data structure is used. Therefore, the initial value range is (0, 6) in our example, with 0 being the lower bound and 6 being the upper bound.

As the first step, we will encode the length of the current entities list. Since the entities list can at most contain all elements within the value range, the length cannot be larger than seven. Therefore, the number of bits required to encode the length of the entities list is given by $[\log_2(\text{upper\_bound}-\text{lower\_bound}+1)]$, which results in 3 bits for the value range of our example. As the list "0, 1, 3, 5, 6" contains 5 elements, the number 5 is encoded by 3 bits. The encoded value is appended to a bit sequence, as shown below.

TABLE 49

BIC encoded entities lists

| Position | 0 | 1 | 2 | 3 | 4 | 5 | 6 | 7 | 8 | 9 | 10 |
|---|---|---|---|---|---|---|---|---|---|---|---|
| Bit | 1 | 0 | 1 | | | | | | | | |

5 by 3 bits

During decoding, the same initial value range must be provided to the algorithm as during encoding. From this value range, the decoding algorithm could infer that the length was stored with 3 bits.

After encoding the list length, BIC encodes the median value of the entities list, then recursively encodes the identities IDs left of the median value and then recursively encodes the identity IDs right of the median value. The same order of operations must be performed during decoding. The decoding algorithm can then infer the length of the left and right sub-lists from the length of the current list.

The first median value in our example is "3". The number of bits required to encode the median value is again defined by the value range, with the same formula used to determine the number of bits required for the length. Therefore, the identity ID "3" is encoded using 3 bits and the result appended to the bit sequence.

TABLE 50

BIC encoded entities lists

| Position | 0 | 1 | 2 | 3 | 4 | 5 | 6 | 7 | 8 | 9 | 10 |
|---|---|---|---|---|---|---|---|---|---|---|---|
| Bit | 1 | 0 | 1 | 0 | 1 | 1 | | | | | |

3 by 3 bits

Next, the left sub-list "0, 1" is encoded. Whenever the BIC algorithm recursively encodes a left sub-list, the upper bound of the value range is limited to the previously encoded median value minus one. Since the identity IDs are sorted and unique, every element left of the current median must be smaller. In our example, the value range for the encoding of the left sub-list is limited to (0, 2). The decoding algorithm would limit the value range in the same way after reading the first median value "3". This enables BIC to uniquely decode a variable bit-length encoding without having to store the individual lengths explicitly.

The next median value to encode is "1". For even list lengths, the choice of the median element must be done consistently, but the concrete choice doesn't matter. Based on the value range (0, 2), 2 bits are needed for the encoding, leading to the following bit sequence. Therefore "0 1" is appended to the bit string.

TABLE 51

| | BIC encoded entities lists | | | | | | | | | | |
|---|---|---|---|---|---|---|---|---|---|---|---|
| Position | 0 | 1 | 2 | 3 | 4 | 5 | 6 | 7 | 8 | 9 | 10 |
| Bit | 1 | 0 | 1 | 0 | 1 | 1 | 0 | 1 | | | |

Afterwards, the left sub-list "0" is recursively encoded and the value range reduced to (0, 0). The median value in this single-element list is of course "0". However, since zero is the only value allowed by the value range, there is no need to store it. During decoding, it can be implicitly inferred from the value range.

Since the list "0" has neither a left, nor a right sub-list, the recursive algorithm returns to the previous list "0, 1". As the left sub-list has already been encoded and there is no right sub-list, the algorithm goes back another step to the original list "0, 1, 3, 5, 6" and then recursively encodes the right sub-list "5, 6".

When moving to a right sub-list, the lower bound of the value range is limited to the previously encoded median value plus one. Since the identity IDs are sorted and unique, every element right of the current median must be larger. In our example, the value range is limited to (4, 6).

The median of the sub-list is "6". Since the value range encompasses 3 possible values, 2 bits are needed for the encoding of the median. If the lower bound of the value range is larger than zero, it must be subtracted from the median before the encoding. Therefore, the value 2 will be encoded with 2 bits. During decoding, the lower bound can be easily added to the decoded value to get the original median. Appending the encoded median results in the following bit sequence.

TABLE 52

| | BIC encoded entities lists | | | | | | | | | | |
|---|---|---|---|---|---|---|---|---|---|---|---|
| Position | 0 | 1 | 2 | 3 | 4 | 5 | 6 | 7 | 8 | 9 | 10 |
| Bit | 1 | 0 | 1 | 0 | 1 | 1 | 0 | 1 | 1 | 0 | |

Finally, the algorithm recursively encodes the left sub-list "5" and limits the value range to (4, 5). The lower bound is again subtracted from the median "5" and the resulting value encoded with a single bit.

TABLE 53

| | BIC encoded entities lists | | | | | | | | | | |
|---|---|---|---|---|---|---|---|---|---|---|---|
| Position | 0 | 1 | 2 | 3 | 4 | 5 | 6 | 7 | 8 | 9 | 10 |
| Bit | 1 | 0 | 1 | 0 | 1 | 1 | 0 | 1 | 1 | 0 | 1 |

The same process is employed to encode the next entities list "0, 2" with rank 1 and the resulting bits are appended to the same bit sequence. The initial value range is again (0, 6), leading to the following state.

TABLE 54

| | BIC encoded entities lists | | | | | | | | | | |
|---|---|---|---|---|---|---|---|---|---|---|---|
| Position | 0 | 1 | 2 | 3 | 4 | 5 | 6 | 7 | 8 | 9 | 10 |
| Bit | 1 | 0 | 1 | 0 | 1 | 1 | 0 | 1 | 1 | 0 | 1 |
| Position | 11 | 12 | 13 | 14 | 15 | 16 | 17 | | | | |
| Bit | 0 | 1 | 0 | 0 | 1 | 0 | 0 | | | | |

After encoding the third entities list "1" with rank 2, we end up with the following final bit sequence.

TABLE 55

| | BIC encoded entities lists | | | | | | | | | | |
|---|---|---|---|---|---|---|---|---|---|---|---|
| Position | 0 | 1 | 2 | 3 | 4 | 5 | 6 | 7 | 8 | 9 | 10 |
| Bit | 1 | 0 | 1 | 0 | 1 | 1 | 0 | 1 | 1 | 0 | 1 |
| Position | 11 | 12 | 13 | 14 | 15 | 16 | 17 | 18 | 19 | 20 | 21 |
| Bit | 0 | 1 | 0 | 0 | 1 | 0 | 0 | 0 | 0 | 1 | 0 |
| Position | 22 | | | | | 23 | | | | | |
| Bit | 0 | | | | | 1 | | | | | |

From the encoding process, we also directly get the offsets of the individual entities lists within the bit sequence, which we can use to build a mapping from the entities list rank to the corresponding offset.

| Rank | → | Offset |
|---|---|---|
| 0 | → | 0 |
| 1 | → | 11 |
| 2 | → | 18 |

As demonstrated above and shown in Tab. 55 and FIG. 14, three lists of IDS "1; 0, 1, 3, 5, 6; 0, 2" were encoded by 23 bits only. If we assume that a single integer has a length of 4 bytes, then 8 integers making up the 3 lists take at least 32 bytes, which is 256 bits. Therefore, the BIC encoding of the column IDS in the entities list brings about a 91% reduction of size.

As can be seen in the example, the MPHF, the signature bits, the rank offset prefix sum, the encoded ranks, and the encoded entities lists are all stored in bit sequences, which comprise the immutable probabilistic data structure. To execute queries, no other data structures need to be created based on these bit sequences. This fact makes it highly efficient to load an immutable probabilistic data structure into memory for query execution, as it only requires loading byte arrays from disk without further transformations. It also enables the data structure to operate on memory mapped files and rely on the operating system to keep frequently used memory regions in main memory. Due to the small size of the immutable data structure, multiple computers, CPUs or cores can simultaneously load it, preferably into the RAM, and queries can be executed in parallel, which greatly improves the speed in case of complex queries.

Of course it would have been possible to compress the mutable probabilistic data structure by compression algorithms known in the art, e.g. ZIP or zStandard compression. However, before querying the compressed data structure, the data would have to be decompressed first, and then the data tables would have to be built-up. Only after these steps, the query can be executed.

The necessary steps to retrieve the identities IDS for a queried token are explained in the next examples. In this example, we will demonstrate how queries are executed on the immutable probabilistic data structure constructed in the previous example.

We assume the following state for the compressed static function which encodes the mapping from the token hash T # to its MPH value T #*, and from the T #* to the signature bits and the entities list rank. The state is taken from the previous example and the exact bit-level encoding of the compressed static function can be seen there. Note that the column TokenHash is not part of the Compressed Static Function and was printed in Tab. 56 for easier understanding only; only the columns T #*, Signature Bits and Rank in Tab. 56 and the compressed Entities list in Tab. 57 form the Compressed Static Function.

TABLE 56

Compressed Static Function

| TokenHash T# | T#* | Signature Bits | Rank |
|---|---|---|---|
| 0x09e9758e (client) | 0 | 0x8e | 0 |
| 0x7003937f (clientId) | 1 | 0x7f | 0 |
| 0xc1e61e57 (authentication) | 2 | 0x57 | 0 |
| 0xdcf4527d (failed) | 3 | 0x7d | 0 |
| 0x3cb4f048 (of) | 4 | 0x48 | 2 |
| 0x63a2c684 (81195) | 5 | 0x84 | 1 |
| 0xd9a3428f (authenticating) | 6 | 0x8f | 0 |
| 0xd112a2e8 (with) | 7 | 0xe8 | 1 |

For the entities lists, the following state is assumed. It is again taken from the previous example, which also shows the bit-level encodings.

TABLE 57

Entities lists

| Rank | Offset | IDS |
|---|---|---|
| 0 | 0 | 0, 1, 3, 5, 6 |
| 1 | 11 | 0, 2 |
| 2 | 18 | 1 |

FIG. 15 is used to explain the querying of query tokens on the immutable, compressed probabilistic data structure.

In a first application example, let's assume a query which tries to retrieve the identity IDS for a single token which is not contained in the data structure. After receiving the query token T from the query consumer (step 800), the token T is hashed with the same hash function used during the construction of the probabilistic data structure (step 810).

| Token T | → | Token hash T# |
|---|---|---|
| unknown | → | 0xc16814de |

Next, the token hash T # is hashed again using the MPHF (step 830). Since the token hash wasn't included in the key set for the construction of the MPHF, the MPHF will either directly determine that the token hash isn't encoded in it, or it will return a random MPH. Since the latter case is more likely, it is assumed that T #*="3" is returned.

Based on T #*, the column T #* in the compressed static function is checked whether it contains T #* (step 850). As T #*="3" is contained, the signature bits "0x7d" in the fourth row are retrieved and compared to the least significant bits of the token hash (steps 870 and 880). Since the signature bits "0x7d" do not match the least-significant 8 bits "0xde" of the token hash in step 890, IDS is an empty list, i.e. IDS=" " (step 900). In step 940, the query consumer is notified about the empty list of identities IDS and the query execution stops.

The second case handles a query which tries to retrieve the identities IDS for a single token which is contained in the data structure. Again, the query starts by hashing the query token T.

| Token T | → | Token hash T# |
|---|---|---|
| 81195 | → | 0x63a2c684 |

Next, T # is hashed again using the MPHF resulting in T #*="5" (steps 830 and 840). As T #* is contained in column T #* of the compressed static function, the 6th row is accessed and the signature bits "0x84" are read-in (steps 870 and 880). In step 890, the least-significant bits of the token hash "0x84" are compared to the signature bits "0x84". Since the signature bits are equal, the query token is assumed to be contained in the probabilistic data structure. In step 910, the rank "1" is read from the Compressed Static Function, the rank of the entities list for this token can be decoded from the compressed static function.

The decoded rank "1" can afterwards be mapped to offset "11" of the corresponding entities list in the encoded entities lists bit sequence. Having the exact offset, it's possible to decode the BIC encoded identities IDS "0" and "2" (step 930). In step 940, IDS is output to the query consumer. Since only a single token was queried, the query execution stops at this point.

More complex queries with multiple query tokens are handled as described in the query example for the mutable probabilistic data structure above. Entities lists IDS are deduplicated during the query execution and after every entities list passed to the query consumer, the query can be aborted early. The only difference is the process of finding and decoding the entities list of a single query token, which was described above.

The immutable probabilistic data structure is stored in a file format displayed in FIG. 16. The first part 710 of the data structure is about 20 bytes long and contains the version of the probabilistic data structure and the utilized encoding steps. The next part 720 of the data structure is about 100 bytes long and contains header information for the data structures, e.g. groups together all header information of internal data-structures (number of rows, bits per value, etc.). The last part 730 of the data structure contains all the data stored in the probabilistic data structure. The grouping of all the header information of the data structures in the second part 720 of the data structure file ensures a minimum number of accessed disk pages when creating a data structure reader. The information stored in the first and second parts 710, 720 of the data structure is sufficient to determine the layout of all data stored in third part 730 of the data structure. If the data structure reader operates on a memory mapped file, part 730 does not have to be accessed at all in order to create the data structure reader and parts 710 and 720 will typically fit into a single disk page. This file layout is especially beneficial if the data structure reader creation is a highly frequent operation.

The techniques described herein may be implemented by one or more computer programs executed by one or more processors. The computer programs include processor-executable instructions that are stored on a nontransitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways.

What is claimed is:

1. A computer-implemented method for storing log data generated in a distributed computing environment, comprising:
    receiving a data element from a log line, where the data element is associated with a given computing source at which the log line was produced;
    applying a hash function to the data element to generate a hash value;
    updating a listing of computing entities with the given computing source, where entries in the listing of computing entities can identify more than one computing source and each entry in the listing of computing entities specifies a unique set of computing sources;
    storing the hash value, along with an address, in a token map table of a probabilistic data structure, where the address maps the hash value to an entry in the listing of computing entities; and
    the addresses in the token map table and encoding the entries in the listing of computing entities, wherein the probabilistic data structure is stored in a file format having three sequential sections, where a first section of the file format contains a version number and information describing encoding steps applied to the data stored in the probabilistic data structure, a second section of the file format contains header information, and a third section of the file format contains the data stored in the probabilistic data structure.

2. The method of claim 1 wherein each entry in the listing of computing entities further includes a counter, a list of computing entities and a hash value for the list of computing entities, where the counter indicates the number of entries in the probabilistic data structure mapped to a given entry in the listing of computing entities.

3. The method of claim 2 wherein updating the listing of computing entities with the given computing source further comprises
    determining whether the hash value is stored in the probabilistic data structure;
    retrieving an entry in the listing of computing entities corresponding to the hash value, where the entry is retrieved in response to a determination that the hash value is stored in the probabilistic data structure;
    from the retrieved entry, determining whether the given computing source is in the list of computing entities;
    incrementing the counter by one in the retrieved entry in response to a determination that the given computing source is contained in the list of computing entities; and
    creating a new entry in the listing of computing entities and setting the counter in the new entry to one in response to a determination that the given computing source is absent from the list of computing entities.

4. The method of claim 3 wherein creating a new entry in the listing of computing entities includes generating a hash value for the list of computing entities using a commutative hash function.

5. The method of claim 3 wherein updating the listing of computing entities with the given computing source further comprises adding an entry into the probabilistic data structure for the hash value, where the entry is added in response to a determination that the hash value is absent from the probabilistic data structure.

6. The method of claim 2 further comprises creating a lookup table having an index, where each entry in the lookup table includes a hash value for the list of computing entities and each entry corresponds to an entry in the listing of computing entities.

7. The method of claim 6 wherein each entry in the lookup table includes an address, where the address maps the hash value of the entry to an entry in the listing of computing entities.

8. The method of claim 1 further comprises receiving a data stream, where the data stream includes the log line, and tokenizing the log line to create a plurality of data elements.

9. The method of claim 1 wherein the hash function is further defined as Minimal Perfect Hash function.

10. The method of claim 1 wherein the hash function is further defined as a Compressed Static function and the hash function is applied to the data element and the corresponding address.

11. The method of claim 1 wherein the addresses in the token map table are encoded using entropy encoding.

12. The method of claim 1 further comprises sorting entries in the token map table by address and according to value of a counter in the listing of computing entities, wherein each entry in the listing of computing entities further includes a counter and the counter indicates the number of entries in the token map table mapped to a given entry in the listing of computing entities.

13. The method of claim 1 wherein the entries in the listing of computing entities are encoded using a Binary Interpolative Coding method.

14. A non-transitory computer-readable medium having computer-executable instructions that, upon execution of the instructions by a processor of a computer, cause the computer to perform:
  receiving a data element from a log line, where the data element is associated with a given computing source at which the log line was produced;
  applying a hash function to the data element to generate a hash value;
  updating a listing of computing entities with the given computing source, where entries in the listing of computing entities can identify more than one computing source and each entry in the listing of computing entities specifies a unique set of computing sources;
  storing the hash value, along with an address, in a probabilistic data structure, where the address maps the hash value to an entry in the listing of computing entities; and
  encoding the addresses in the token map table and encoding the entries in the listing of computing entities, wherein the probabilistic data structure is stored in a file format having three sequential sections, where a first section of the file format contains a version number and information describing encoding steps applied to the data stored in the probabilistic data structure, a second section of the file format contains header information, and a third section of the file format contains the data stored in the probabilistic data structure.

15. The non-transitory computer-readable medium of claim 14 wherein each entry in the listing of computing entities further includes a counter, a list of computing entities and a hash value for the list of computing entities, where the counter indicates the number of entries in the probabilistic data structure mapped to a given entry in the listing of computing entities.

16. The non-transitory computer-readable medium of claim 15 wherein updating the listing of computing entities with the given computing source further comprises
  determining whether the hash value is stored in the probabilistic data structure;
  retrieving an entry in the listing of computing entities corresponding to the hash value, where the entry is retrieved in response to a determination that the hash value is stored in the probabilistic data structure;
  from the retrieved entry, determining whether the given computing source is in the list of computing entities;
  incrementing the counter by one in the retrieved entry in response to a determination that the given computing source is contained in the list of computing entities; and
  creating a new entry in the listing of computing entities and setting the counter in the new entry to one in response to a determination that the given computing source is absent from the list of computing entities.

17. The non-transitory computer-readable medium of claim 16 wherein creating a new entry in the listing of computing entities includes generating a hash value for the list of computing entities using a commutative hash function.

18. The non-transitory computer-readable medium of claim 16 wherein updating the listing of computing entities with the given computing source further comprises adding an entry into the probabilistic data structure for the hash value, where the entry is added in response to a determination that the hash value is absent from the probabilistic data structure.

19. The non-transitory computer-readable medium of claim 15 wherein the computer-executable instructions further perform creating a lookup table having an index, where each entry in the lookup table includes a hash value for the list of computing entities and each entry corresponds to an entry in the listing of computing entities.

20. The non-transitory computer-readable medium of claim 19 wherein each entry in the lookup table includes an address, where the address maps the hash value of the entry to an entry in the listing of computing entities.

21. The non-transitory computer-readable medium of claim 14 wherein the computer-executable instructions further perform receive a data stream, where the data stream includes the log line, and tokenize the log line to create a plurality of data elements.

* * * * *